(12) United States Patent
Huang

(10) Patent No.: US 11,994,657 B2
(45) Date of Patent: May 28, 2024

(54) OPTICAL IMAGING LENS ASSEMBLY

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/213,251

(22) Filed: Jun. 22, 2023

(65) Prior Publication Data
US 2023/0333351 A1     Oct. 19, 2023

Related U.S. Application Data

(63) Continuation of application No. 18/077,941, filed on Dec. 8, 2022, now Pat. No. 11,726,303, which is a continuation of application No. 17/474,848, filed on Sep. 14, 2021, now Pat. No. 11,550,129, which is a continuation of application No. 16/863,909, filed on Apr. 30, 2020, now Pat. No. 11,150,446, which is a
(Continued)

(30) Foreign Application Priority Data

Jun. 28, 2011 (TW) ................................ 100122689

(51) Int. Cl.
*G02B 13/00* (2006.01)
*G02B 9/60* (2006.01)
*G02B 13/18* (2006.01)

(52) U.S. Cl.
CPC ........... *G02B 13/0045* (2013.01); *G02B 9/60* (2013.01); *G02B 13/18* (2013.01)

(58) Field of Classification Search
CPC .............................. G02B 9/60; G02B 13/0045
USPC .......................... 359/714, 766, 764, 763, 753
See application file for complete search history.

(56) References Cited

U.S. PATENT DOCUMENTS

| 1,759,529 A | 5/1930 | Von Hofe |
| 2,394,959 A | 2/1946 | Wynne |

(Continued)

FOREIGN PATENT DOCUMENTS

| CN | 101421658 A | 4/2009 |
| CN | 201278039 Y | 7/2009 |

(Continued)

*Primary Examiner* — Zachary W Wilkes
(74) *Attorney, Agent, or Firm* — Maschoff Brennan

(57) ABSTRACT

This disclosure discloses an optical imaging lens assembly, sequentially arranged from an object side to an image side along an optical axis, comprising: the first lens element with positive refractive power, the second lens element with negative refractive power having a convex object-side surface and a concave image-side surface, the third lens element with positive refractive power, the fourth lens element with negative refractive power having a concave object-side surface and a convex image-side surface, the fifth lens element with refractive power having a concave image-side surface, and both object-side surface and image-side surface being aspheric, wherein a stop and an image sensor disposed on an image plane are also provided. By such arrangements, the image pickup optical system satisfies conditions related to shorten the total length and to reduce the sensitivity for use in compact cameras and mobile phones with camera functionalities.

20 Claims, 14 Drawing Sheets

Related U.S. Application Data continuation of application No. 16/537,355, filed on Aug. 9, 2019, now Pat. No. 10,690,890, which is a continuation of application No. 15/676,943, filed on Aug. 14, 2017, now Pat. No. 10,422,979, which is a continuation of application No. 15/189,997, filed on Jun. 22, 2016, now Pat. No. 9,772,472, which is a continuation of application No. 14/043,122, filed on Oct. 1, 2013, now Pat. No. 9,400,373, which is a continuation of application No. 13/349,908, filed on Jan. 13, 2012, now Pat. No. 8,576,498.

(56) References Cited

U.S. PATENT DOCUMENTS

| | | |
|---|---|---|
| 2,662,446 A | 12/1953 | Tronnier |
| 3,472,577 A | 10/1969 | Rosin et al. |
| 3,592,530 A | 7/1971 | Klein |
| 3,749,478 A | 7/1973 | Nakagawa et al. |
| 4,035,063 A | 7/1977 | Ikeda |
| 4,114,992 A | 9/1978 | Kimura |
| 4,458,991 A | 7/1984 | Yamada |
| 4,557,581 A | 12/1985 | Woolley et al. |
| 4,721,371 A | 1/1988 | Imai |
| 4,733,953 A | 3/1988 | Yamamoto et al. |
| 4,753,519 A | 6/1988 | Miyatake |
| 4,770,513 A | 9/1988 | Fujie et al. |
| 4,787,721 A | 11/1988 | Fukushima et al. |
| 4,832,465 A | 5/1989 | Arai et al. |
| 5,002,372 A | 3/1991 | Tamamura et al. |
| 5,515,209 A | 5/1996 | Buchroeder et al. |
| 5,661,604 A | 8/1997 | Kuba |
| 5,790,323 A | 8/1998 | Caplan et al. |
| 5,828,498 A | 10/1998 | Sekiya et al. |
| 5,936,775 A | 8/1999 | Abe |
| 6,154,322 A | 11/2000 | Nakayama |
| 6,166,861 A | 12/2000 | Koizumi |
| 7,110,188 B2 | 9/2006 | Matsui et al. |
| 7,443,610 B1 | 10/2008 | Lin et al. |
| 7,480,105 B2 | 1/2009 | Mori |
| 7,502,181 B2 | 3/2009 | Shinohara |
| 7,710,665 B2 | 5/2010 | Park et al. |
| 7,826,151 B2 | 11/2010 | Tsai |
| 7,864,454 B1 | 1/2011 | Tang et al. |
| 7,880,981 B2 | 2/2011 | Do |
| 7,911,711 B1 | 3/2011 | Tang et al. |
| 7,965,454 B2 | 6/2011 | Tanaka et al. |
| 8,000,030 B2 | 8/2011 | Tang |
| 8,000,031 B1 | 8/2011 | Tsai |
| 8,072,695 B1 | 12/2011 | Lee et al. |
| 8,179,613 B2 | 5/2012 | Sano |
| 8,203,796 B2 | 6/2012 | Ohtsu |
| 8,228,611 B2 | 7/2012 | Lu et al. |
| 8,358,474 B2 | 1/2013 | Kwon |
| 8,395,851 B2 | 3/2013 | Tang et al. |
| 8,395,852 B2 | 3/2013 | Tsai et al. |
| 8,400,716 B2 | 3/2013 | Jeong |
| 8,411,374 B2 | 4/2013 | Ohtsu |
| 8,547,649 B2 | 10/2013 | Lai |
| 8,575,498 B2 | 11/2013 | Lischeck et al. |
| 8,576,498 B2 | 11/2013 | Huang |
| 8,599,498 B2 | 12/2013 | Huang |
| 8,654,242 B2 | 2/2014 | Matsusaka et al. |
| 8,654,457 B2 | 2/2014 | Jin et al. |
| 8,760,775 B2 | 6/2014 | Shinohara |
| 8,842,377 B2 | 9/2014 | Kubota et al. |
| 8,917,457 B2 | 12/2014 | Matsusaka et al. |
| 9,400,373 B2 | 7/2016 | Huang |
| 9,772,472 B2 | 9/2017 | Huang |
| 10,422,979 B2 | 9/2019 | Huang |
| 10,690,890 B2 | 6/2020 | Huang |
| 11,150,446 B2 | 10/2021 | Huang |
| 11,550,129 B2 * | 1/2023 | Huang ............... G02B 9/60 |
| 11,726,303 B2 * | 8/2023 | Huang ............ G02B 13/0045 |
| | | 359/714 |

| | | |
|---|---|---|
| 2003/0011772 A1 | 1/2003 | Abe et al. |
| 2003/0117722 A1 | 6/2003 | Chen |
| 2004/0196571 A1 | 10/2004 | Shinohara |
| 2004/0240080 A1 | 12/2004 | Matsui et al. |
| 2010/0134904 A1 | 6/2010 | Tsai |
| 2010/0188555 A1 | 7/2010 | Hirao et al. |
| 2010/0214467 A1 | 8/2010 | Ohtsu |
| 2010/0220229 A1 | 9/2010 | Sano |
| 2010/0253829 A1 | 10/2010 | Shinohara |
| 2010/0254029 A1 | 10/2010 | Shinohara |
| 2010/0284091 A1 | 11/2010 | Okamoto |
| 2011/0149415 A1 | 6/2011 | Jeong |
| 2011/0188131 A1 | 8/2011 | Sano |
| 2011/0249348 A1 | 10/2011 | Kubota et al. |
| 2011/0273611 A1 | 11/2011 | Matsusaka et al. |
| 2012/0075721 A1 | 3/2012 | Konishi et al. |
| 2012/0140104 A1 | 6/2012 | Ozaki |
| 2012/0162769 A1 | 6/2012 | Suzuki et al. |
| 2013/0088635 A1 | 4/2013 | Sano |

FOREIGN PATENT DOCUMENTS

| | | | |
|---|---|---|---|
| CN | 100582856 C | 1/2010 | |
| CN | 101710207 A | 5/2010 | |
| CN | 201503515 U | 6/2010 | |
| CN | 201594156 U | 9/2010 | |
| CN | 102313972 A | 1/2012 | |
| JP | S57-73713 A | 5/1982 | |
| JP | S57-135911 A | 8/1982 | |
| JP | S58-33211 A | 2/1983 | |
| JP | S58-46312 A | 3/1983 | |
| JP | S58-62609 A | 4/1983 | |
| JP | S59-83121 A | 5/1984 | |
| JP | S60-29717 A | 2/1985 | |
| JP | S60-232521 A | 11/1985 | |
| JP | S61-4088 B2 | 2/1986 | |
| JP | S61-42632 A | 3/1986 | |
| JP | S61-80119 A | 4/1986 | |
| JP | S62-39811 A | 2/1987 | |
| JP | S63-116112 A | 5/1988 | |
| JP | H04-261510 A | 9/1992 | |
| JP | H04-298709 A | 10/1992 | |
| JP | H05-303033 A | 11/1993 | |
| JP | H07-181391 A | 7/1995 | |
| JP | H07-270679 A | 10/1995 | |
| JP | H08-122634 A | 5/1996 | |
| JP | H09-54259 A | 2/1997 | |
| JP | H09-68651 A | 3/1997 | |
| JP | H09-189868 A | 7/1997 | |
| JP | H11-72720 A | 3/1999 | |
| JP | H11-174345 A | 7/1999 | |
| JP | H11-305125 A | 11/1999 | |
| JP | H11-326789 A | 11/1999 | |
| JP | 2000-019393 A | 1/2000 | |
| JP | 2005-265950 A | 9/2005 | |
| JP | 2007-264180 A | 10/2007 | |
| JP | 2007-298572 A | 11/2007 | |
| JP | 2009-136385 A | 6/2009 | |
| JP | 2009-136386 A | 6/2009 | |
| JP | 2009-186595 A | 8/2009 | |
| JP | 2009-223251 A | 10/2009 | |
| JP | 2009-294527 A | 12/2009 | |
| JP | 2010-197665 A | 9/2010 | |
| JP | 2010-224521 A | 10/2010 | |
| JP | 2010-256608 A | 11/2010 | |
| JP | 2011-085733 A | 4/2011 | |
| JP | 2011-095513 A | 5/2011 | |
| JP | 2012-103717 A | 5/2012 | |
| JP | 5426313 B2 | 2/2014 | |
| KR | 10-2009-0055115 A | 6/2009 | |
| KR | 10-2010-0001525 A | 1/2010 | |
| KR | 20100067515 A * | 6/2010 | ......... G02B 13/0045 |
| TW | 200722785 A | 6/2007 | |
| WO | 2004/107009 A1 | 12/2004 | |
| WO | 2010/001713 A1 | 1/2010 | |
| WO | 2010/024214 A1 | 3/2010 | |
| WO | 2010/143459 A1 | 12/2010 | |

(56) References Cited

FOREIGN PATENT DOCUMENTS

| WO | 2011/004467 A1 | 1/2011 |
| WO | 2011/021271 A1 | 2/2011 |
| WO | 2011/027690 A1 | 3/2011 |

\* cited by examiner

OPTICAL IMAGING LENS ASSEMBLY

CROSS-REFERENCE TO RELATED APPLICATION

This application is a continuation patent application of U.S. application Ser. No. 18/077,941, filed on Dec. 8, 2022, which is a continuation patent application of U.S. application Ser. No. 17/474,848, filed on Sep. 14, 2021, which is a continuation patent application of U.S. application Ser. No. 16/863,909, filed on Apr. 30, 2020, which is a continuation patent application of U.S. application Ser. No. 16/537,355, filed on Aug. 9, 2019, which is a continuation patent application of U.S. application Ser. No. 15/676,943, filed on Aug. 14, 2017, which is a continuation patent application of U.S. application Ser. No. 15/189,997, filed on Jun. 22, 2016, which is a continuation patent application of U.S. application Ser. No. 14/043,122, filed on Oct. 1, 2013, which is a continuation patent application of U.S. application Ser. No. 13/349,908, filed on Jan. 13, 2012, the entire contents of which are hereby incorporated by reference for which priority is claimed under 35 U.S.C. § 120. The U.S. application Ser. No. 13/349,908 is a non-provisional application claims priority to Taiwan Application Serial Number 100122689, filed on Jun. 28, 2011, which is incorporated by reference herein in its entirety.

BACKGROUND

Technical Field

The present disclosure relates to an optical imaging lens assembly, and more particularly to the optical imaging lens assembly to shorten total length and lower cost for applying to electronic products.

Description of the Related Art

In compact electronic products such as digital still cameras or mobile phone cameras, an optical imaging lens assembly is generally installed for capturing images of an object, and the optical imaging lens assembly tends to be developed with a compact design and a low cost, while meeting the user requirements of good aberration correction ability, high resolution, and high image quality.

In general, a conventional optical imaging lens assembly of a compact electronic product comes with different designs, including the two-lens, three-lens, four-lens, and five-or-more lens designs. However, if the imaging quality is taken into consideration, the optical imaging lens assembly with the four-lens or five-lens designs has advantages on image aberration and modulation transfer function (MTF) performance, wherein the five-lens design having a higher resolution than the four-lens designs thus being applicable for electronic products requiring the high quality and high pixels.

In various compact designs of the five-lens optical imaging lens assembly having a fixed focal length, prior arts adopt different combinations of positive and negative refractive powers and a group of stacked lens elements as disclosed in publications and U.S. Pat. Nos. US2004/0196571 and US2003/0117722, or the first lens element with negative refractive power for reducing the total length of the optical system as disclosed in U.S. Pat. No. 7,480,105.

In products such as compact digital cameras, web cameras, and mobile phone cameras, the optical imaging lens assembly requires a compact design, a short focal length, and a good aberration correction. In various different five-lens designs for an optical imaging lens assembly with a fixed focal length, it is relatively difficult for a combination of the fourth lens element and the fifth lens element with different refractive powers, and the fourth lens element or the fifth lens element having an inflection point to achieve a good aberration correction and meet the design requirement for the total length of the optical imaging lens assembly. As disclosed in U.S. Pat. No. 7,710,665, a good aberration correction can be achieved, but the total length of the optical imaging lens assembly still fails to meet the requirements to satisfy the specifications for compact electronic device. As disclosed in publications and U.S. Pat. No. 7,826,151, US2010/0254029, US2010/0253829, the fourth lens element and the fifth lens element having an inflection point respectively are used for designing a shorter total length. As disclosed in publications and U.S. Pat. Nos. 7,826,151, 7,502,181, and US2010/0134904, a combination of the first lens element with positive refractive power, the second lens element with negative refractive power and the third lens element with positive refractive power are used to achieve a higher image capturing ability.

Among these prior arts, the fourth lens element or fifth lens element having an inflection point can correct aberration or distortion, but a longer distance between the third lens element and the fourth lens element is required, which is unfavorable to the design of a shorter total length.

Therefore, the present disclosure provides a more practical design to shorten the optical imaging lens assembly, while using a combination of refractive powers and a combination of convex and concave surfaces of five lens elements to reduce the total length of the optical imaging lens assembly and improve the image quality, so that the optical imaging lens assembly can be applied to compact electronic products.

SUMMARY

Therefore, it is a primary objective of the present disclosure to provide an optical imaging lens assembly, sequentially arranged from an object side to an image side along an optical axis, comprising: the first lens element, the second lens element, the third lens element, the fourth lens element, and the fifth lens element, wherein the first lens element with positive refractive power has a convex object-side surface; the second lens element with negative refractive power has a convex object-side surface and a concave image-side surface; the third lens element with positive refractive power has a convex image-side surface; the fourth lens element with refractive power has both object-side and image-side surfaces being aspheric; the fifth lens element with refractive power has a concave image-side surface, both object-side surface and image-side surface being aspheric, and at least one of the optical surface having at least one inflection point; and the following relations are satisfied:

$$0.7 < f/f_3 < 2.5 \quad (1)$$

$$0.1 < T23/T34 < 2.0 \quad (2)$$

$$-0.8 < f/R9 < 5.0 \quad (3)$$

$$-4.5 < R_6/CT_3 < -0.5 \quad (4)$$

Wherein, f is a focal length of the optical imaging lens assembly, $f_3$ is a focal length of the third lens element, T23 is an axial distance between the second lens element and the third lens element, T34 is an axial distance between the third lens element and the fourth lens element, $R_6$ is a curvature radius of the image-side surface of the third lens element, R9 is a curvature radius of the object-side surface of the fifth lens element, and $CT_3$ is a central thickness of the third lens element.

On the other hand, the present disclosure provides an optical imaging lens assembly as described above, wherein the third lens element has a concave object-side surface; the fourth lens element and the fifth lens element are made of plastic; the fifth lens element has a convex object-side surface and at least one of the object-side surface and an image-side surface has at least one inflection point, and the optical imaging lens assembly satisfies one or more of the following relations in addition to the relations (1), (2), (3) and (4):

$$-1.5<(R1+R2)/(R1-R2)<-0.3 \quad (5)$$

$$0.82<f/f_3<1.7 \quad (7)$$

$$-1.1<(R1+R2)/(R1-R2)<-0.6 \quad (13)$$

$$0.25<R4/R3<0.55 \quad (14)$$

$$1.3<R10/CT5<3.0 \quad (15)$$

$$-2.5<R_6/CT_3<-1.3 \quad (11)$$

Wherein, R1 is a curvature radius of the object-side surface of the first lens element, R2 is a curvature radius of the image-side surface of the first lens element, R3 is the curvature radius of the object-side surface of the second lens element, R4 is a curvature radius of the image-side surface of the second lens element, $R_6$ is the curvature radius of the image-side surface of the third lens element, R10 is a curvature radius of the image-side surface of the fifth lens element, f is the focal length of the optical imaging lens assembly, $f_3$ is the focal length of the third lens element, $CT_3$ is the central thickness of the third lens element, and CT5 is a central thickness of the fifth lens element.

Moreover, the present disclosure provides an optical imaging lens assembly, sequentially arranged from an object side to an image side along an optical axis, comprising: the first lens element, the second lens element, the third lens element, the fourth lens element, and the fifth lens element, and further comprises a stop. Wherein, the first lens element with positive refractive power has a convex object-side surface and a convex image-side surface; the second lens element with negative refractive power has a convex object-side surface and a concave image-side surface; the third lens element with positive refractive power has a concave object-side surface and a convex image-side surface; the fourth lens element with refractive power has both object-side surface and image-side surface being aspheric and made of plastic; the fifth lens element with refractive power has a convex object-side surface and a concave image-side surface, both being aspheric, at least one of the object-side surface and the image-side surface has at least one inflection point, and made of plastic; and the optical imaging lens assembly satisfies one or more of the following relations in addition to the relations (1), (2), (3) and (4):

$$0.1<R4/R3<0.8 \quad (6)$$

$$0.75<Sd/Td<0.90 \quad (8)$$

$$-0.3<f/R9<3.5 \quad (9)$$

$$25<V1-V2<45 \quad (10)$$

$$-2.5<R_6/CT_3<-1.3 \quad (11)$$

$$25<V3-V4<45 \quad (12)$$

Wherein, R3 is the curvature radius of the object-side surface of the second lens element, R4 is the curvature radius of the image-side surface of the second lens element, $R_6$ is the curvature radius of the image-side surface of the third lens element, R9 is the curvature radius of the object-side surface of the fifth lens element, V1 is an Abbe number of the first lens element, V2 is an Abbe number of the second lens element, V3 is an Abbe number of the third lens element, V4 is the Abbe number of the fourth lens element, f is the focal length of the optical imaging lens assembly, $CT_3$ is the central thickness of the third lens element, Td is an axial distance between the object-side surface of the first lens element and the image-side surface of the fifth lens element, and Sd is an axial distance between the stop and the image-side surface of the fifth lens elements.

Moreover, the present disclosure provides an optical imaging lens assembly, sequentially arranged from an object side to an image side along an optical axis, comprising: the first lens element, the second lens element, the third lens element, the fourth lens element, and the fifth lens element, and further comprises an image sensor at an image plane for imaging an photographed object. Wherein, the first lens element with positive refractive power has a convex object-side surface; the second lens element with negative refractive power has a convex object-side surface and a concave image-side surface; the third lens element with positive refractive power has a convex image-side surface; the fourth lens element with refractive power has both object-side surface and image-side surface being aspheric; the fifth lens element with refractive power has a concave image-side surface and both object-side surface and image-side surface being aspheric; and the optical imaging lens assembly satisfies the following relation in addition to the relations (1), (2), (3) and (4):

$$TTL/ImgH<2.2 \quad (16)$$

Wherein, TTL is an axial distance between the object-side surface of the first lens element and the image plane, and ImgH is a maximum image height of the optical imaging lens assembly.

Another objective of the present disclosure is to provide an optical imaging lens assembly, sequentially arranged from an object side to an image side along an optical axis, comprising: the first lens element, the second lens element, the third lens element, the fourth lens element, and the fifth lens element. Wherein, the first lens element with positive refractive power has a convex object-side surface; the second lens element with negative refractive power has a convex object-side surface and a concave image-side surface; the third lens element with positive refractive power has a convex image-side surface; the fourth lens element with refractive power has a concave object-side surface, both object-side surface and image-side surface are aspheric, and made of plastic; the fifth lens element with refractive power has a concave image-side surface, both object-side surface and image-side are aspheric surface, at least one of the object-side surface and image-side surface has at least one inflection point, and made of plastic; and the optical imaging lens assembly satisfies the following relations:

$$0.82<f/f_3<1.7 \quad (7)$$

$$-0.8<f/R9<6.0 \quad (17)$$

$$-4.5<R_6/CT_3<-0.5 \quad (4)$$

Wherein, f is a focal length of the optical imaging lens assembly, $f_3$ is a focal length of the third lens element, $R_6$ is a curvature radius of the image-side surface of the third lens element, R9 is a curvature radius of the object-side surface of the fifth lens element, and $CT_3$ is a central thickness of the third lens element.

On the other hand, the present disclosure provides an optical imaging lens assembly as described above, and the optical imaging lens assembly satisfies one or more of the following relations in addition to the relations (7), (17) and (4):

$$-2.5 < R_6/CT_3 < -1.3 \qquad (11)$$

$$0.25 < R4/R3 < 0.55 \qquad (14)$$

Wherein, R3 is a curvature radius of the object-side surface of the second lens element, R4 is a curvature radius of the image-side surface of the second lens element, $R_6$ is the curvature radius of the image-side surface of the third lens element, and $CT_3$ is the central thickness of the third lens element.

With the arrangement of the aforementioned first lens element, second lens element, third lens element, fourth lens element and fifth lens element with an appropriate interval apart from one another, the present disclosure can provide a good aberration correction and an advantageous modulation transfer function (MTF) in a greater field of view.

In the optical imaging lens assembly of the present disclosure comprised of the first lens element, second lens element, third lens element, fourth lens element and fifth lens element, the first lens element with positive refractive power provides most of the refractive power required by the system, and the second lens element with negative refractive power can correct aberrations produced by the positive refractive power effectively and correct the Petzval sum of the system to make the image surface on the edge flatter, and the third lens element with positive refractive power can reduce the sensitivity of the manufacturing tolerance of the lenses. The combination of different refractive powers of the fourth lens element and the fifth lens element can be adjusted to provide the necessary refractive power and the aberration produced by the previous three lens elements, and the modulation transfer function (MTF) can be improved to higher resolution of the optical imaging lens assembly, so that the overall aberration and distortion of the optical imaging lens assembly can meet the high resolution requirement.

In the optical imaging lens assembly of the present disclosure, the arrangement of the stop produces a longer distance from the exit pupil of the optical imaging lens assembly to the image plane, so that the light of an image can be projected directly onto the image sensor to avoid dark corners or achieve the telecentric effect on the image side. In general, the telecentric effect can improve the brightness of the image plane and enhance the speed of receiving images by the CCD or CMOS image sensor.

If the fifth lens element has an inflection point, the inflection point can be used for guiding light of an image with an angle out from the edges of the fifth lens element, such that the light of an image at the off-axis view angle is guided and received by the image sensor. In addition, the fifth lens element having a convex object-side surface and a concave image-side surface can correct the astigmatism of the optical system effectively. If the fifth lens element has both concave object-side surface and image-side surface, the principal point of the optical system can be maintained at a position far from the image plane to facilitate reducing the total length of optical imaging lens assembly. The fourth lens element and the fifth lens element are made of plastic to facilitate the manufacture with lower costs.

DETAILED DESCRIPTION OF THE PREFERRED EMBODIMENTS

Figure 1A:
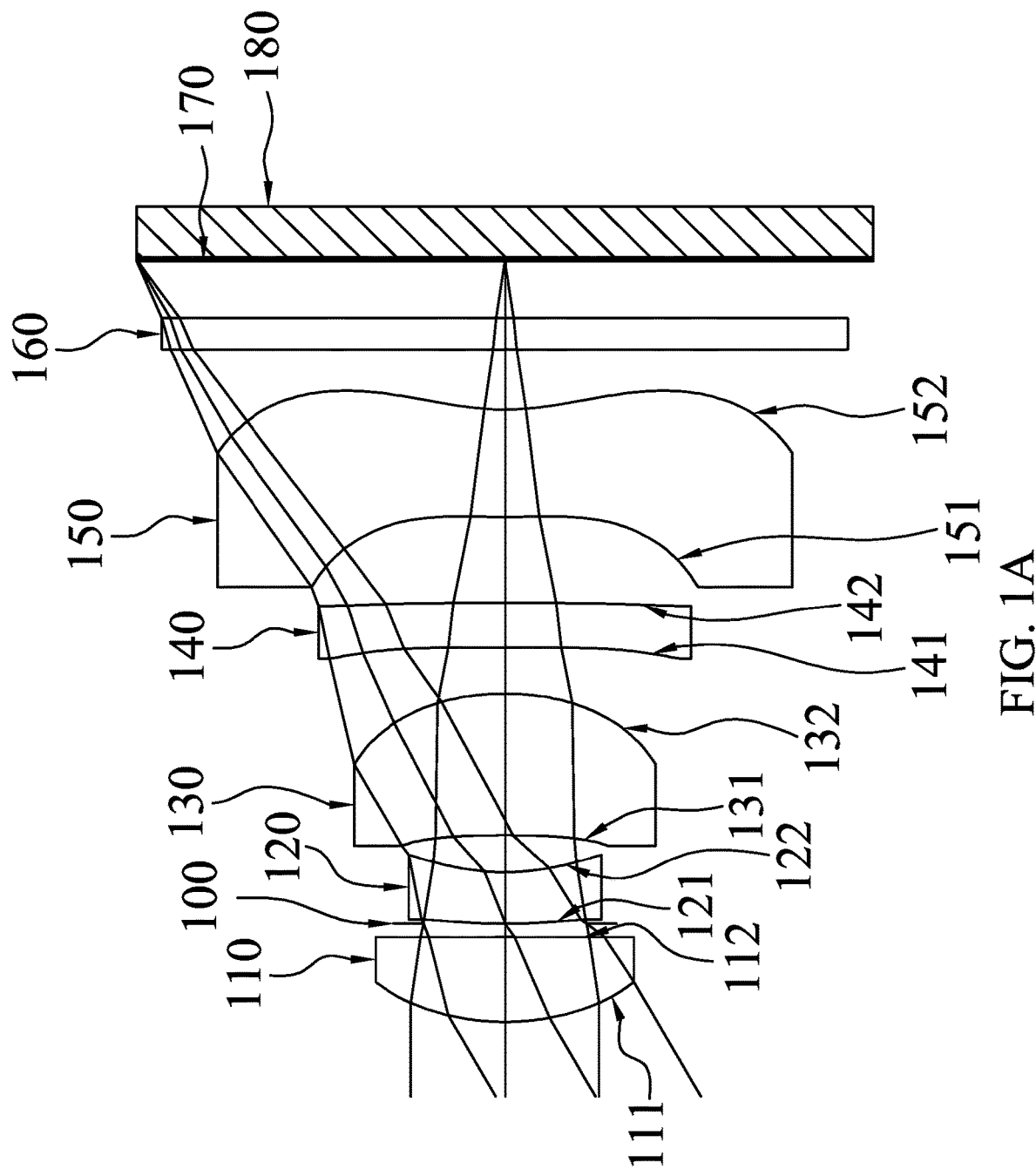
FIG. 1A is a schematic view of an optical imaging lens assembly in accordance with the first preferred embodiment of the present disclosure.

With reference to FIG. 1A for an optical imaging lens assembly of the present disclosure, the optical imaging lens assembly, sequentially arranged from an object side to an image side along an optical axis, comprises: the first lens element 110, the second lens element 120, the third lens element 130, the fourth lens element 140 and the fifth lens element 150, wherein the first lens element 110 with positive refractive power has a convex object-side surface 111; the second lens element 120 with negative refractive power has a convex object-side surface 121 and a concave image-side surface 122; the third lens element 130 with positive refractive power has a convex image-side surface 132; the fourth lens element 140 with refractive power has both object-side surface 141 and image-side surface 142 being aspheric; and the fifth lens element 150 with refractive power has a concave image-side surface 152 and both object-side surface 151 and image-side surface 152 being aspheric. The optical imaging lens assembly further comprises a stop, which here is an aperture stop 100 and an IR-filter 160, wherein the aperture stop 100 is a middle aperture stop installed between the first lens element 110 and the second lens element 120, and the IR-filter 160 is installed between the fifth lens element 150 and the image plane 170 and generally made of panel glass without affecting the focal length f of the optical imaging lens assembly of the present disclosure. The optical imaging lens assembly further comprises an image sensor 180 at the image plane 170 for imaging a photographed object. The aspheric surfaces of the first lens element 110, second lens element 120, third lens element 130, fourth lens element 140, and fifth lens element 150 comply with the aspherical surface formula as given in Equation (18).

$$X(Y) = \frac{(Y^2/R)}{1+\sqrt{(1-(1+K)(Y/R)^2)}} + \sum_i (A_i) \cdot (Y^i) \quad (18)$$

Wherein,

X is the relative height from a point on the aspherical surface with a distance Y from the optical axis to a tangent plane at the tip of the optical axis of the aspherical surface;

Y is the distance between a point on the curvature of the aspherical surface and the optical axis;

R is the curvature radius;

K is the conic coefficient; and $A_i$ is the $i^h$ level aspherical surface coefficient.

In the optical imaging lens assembly of the present disclosure, the first lens element 110, second lens element 120, third lens element 130, fourth lens element 140 and fifth lens element 150 can have spherical or aspheric surfaces. If aspheric optical surfaces are adopted, then the curvature radius of the optical surface can be used for changing the refractive power to reduce or eliminate aberrations, so as to reduce the number of lens elements used in the optical imaging lens assembly and reduce the total length of the optical imaging lens assembly effectively. With the arrangement of the first lens element 110, second lens element 120, third lens element 130, fourth lens element 140, and fifth lens element 150, the optical imaging lens assembly satisfies the relations (1), (2), (3) and (4).

If the relation (1) is satisfied, the refractive power can be allocated by adjusting the focal length f of the optical imaging lens assembly and the focal length $f_3$ of the third lens element 130, so that the refractive power of the third lens element 130 in the optical imaging lens assembly can be allocated effectively to reduce the sensitivity for manufacturing tolerance of the optical imaging lens assembly. In addition, the third lens element 130 has a convex image-side surface 132, so that if the ratio of the curvature radius $R_6$ of the image-side surface 132 of the third lens element 130 to the central thickness $CT_3$ of the third lens element 130 is limited according to the relation (4), the larger the curvature radius of the image-side surface 132, the smaller is the positive refractive power of the third lens element 130. Therefore, the refractive power of the third lens element 130 can be adjusted appropriately to reduce the sensitivity for manufacturing tolerance of the system. An appropriate thickness of the third lens element 130 can assist shortening the total length of the optical imaging lens assembly. If the ratio of the axial distance T23 between the second lens element 120 and the third lens element 130 to the axial distance T34 between the third lens element 130 and the fourth lens element 140 is limited according to the relation (2), the angle of refraction of the light passing through the second lens element 120 and the air gap to enter into the fourth lens element 140 falls within a specific range, so as to increase the angle of refraction and reduce the total length. If the relation (3) is satisfied, the focal length f of the optical imaging lens assembly and the curvature radius R9 of the object-side surface 151 of the fifth lens element 150 can be adjusted appropriately to assist correcting the aberration of the optical imaging lens assembly.

In the optical imaging lens assembly of the present disclosure, if the ratio of the curvature radius R1 of the object-side surface 111 to the curvature radius R2 of the of the image-side surface 112 of the first lens element 110 is limited according to the relations (5) and (13), the surface shape of the first lens element 110 can be limited to assist providing appropriate refractive power for the system. Similarly, the main negative refractive power is provided by the second lens element 120. If the ratio of the curvature radius R3 of the object-side surface 121 to the curvature radius R4 of the image-side surface 122 of second lens element 120 is limited according to the relations (6) and (14), the negative refractive power of the second lens element 120 can be adjusted appropriately to assist correcting the aberration produced by the first lens element 110.

If the relation (10) is satisfied, the difference between the Abbe number V1 of the first lens element 110 and the Abbe number V2 of the second lens element 120 falls within an appropriate range, the chromatic aberration produced by the first lens element 110 and the second lens element 120 can be corrected effectively to improve the chromatic aberration correction ability of the second lens element 120. Similarly, if the relation (12) is satisfied, the chromatic aberration between the third lens element 130 and the fourth lens element 140 can be corrected effectively to improve the chromatic aberration correction ability of the fourth lens element 140.

If the relation (16) is satisfied, wherein ImgH is half of the diagonal length of an effective photosensitive area of the image sensor 180, the total length TTL of the optical imaging lens assembly can be reduced effectively. Similarly, if the relation (8) is satisfied, the distance between the first lens element 110 and the fifth lens element 150 can be limited to reduce the length of the optical imaging lens assembly. If the relation (15) is satisfied, the curvature radius R10 and the central thickness CT5 of the image-side surface 152 of the fifth lens element 150 can be limited appropriately. Such arrangement not only adjusts the refractive power appropriately, but also facilitates shortening the total length.

The optical imaging lens assembly of the present disclosure is described by means of preferred embodiments with relevant drawings as follows.

First Preferred Embodiment

Figure 1B:
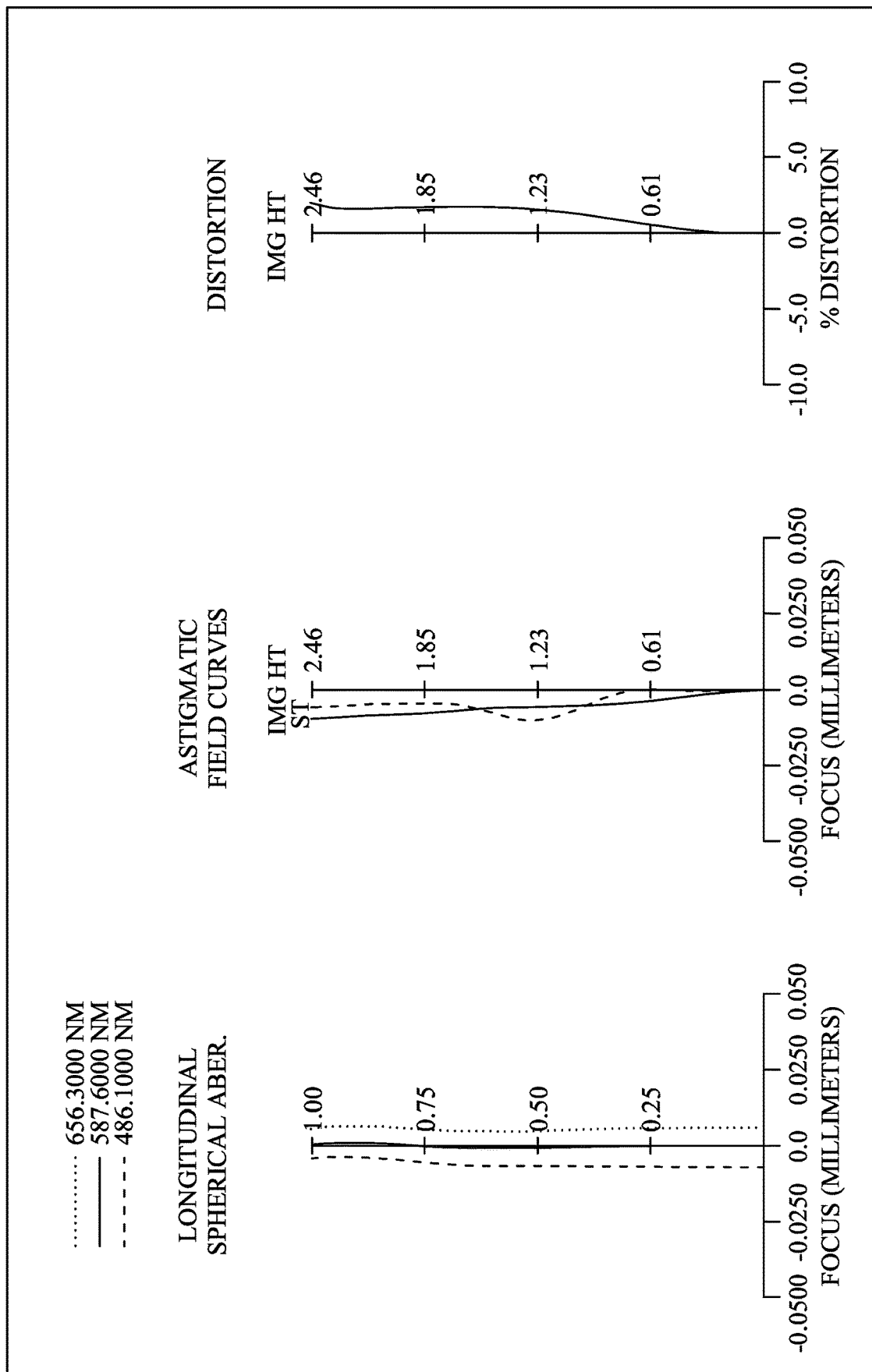
FIG. 1B is a schematic view of a series of aberration curves of the first preferred embodiment of the present disclosure.

With reference to FIGS. 1A and 1B for a schematic view and a series of aberration curves of an optical imaging lens assembly in accordance with the first preferred embodiment of the present disclosure respectively, the optical imaging lens assembly, sequentially arranged from an object side to an image side along an optical axis, comprises: a glass first lens element 110 with positive refractive power having a convex object-side surface 111 and a convex image-side surface 112, and both being aspheric; a stop, which here is an aperture stop 100; a second lens element 120 with negative refractive power having a convex object-side surface 121 and a concave image-side surface 122, both being aspheric, and made of plastic; a third lens element 130 with positive refractive power having a concave object-side surface 131 and a convex image-side surface 132, both being aspheric, and made of plastic; a fourth lens element 140 with positive refractive power having a convex object-side surface 141 and a concave image-side surface 142, both being aspheric, and made of plastic; a fifth lens element 150 with negative refractive power having a convex object-side surface 151 and a concave image-side surface 152, both being aspheric and having at least one inflection point, and made of plastic; an IR-filter 160 made of panel glass for adjusting a wavelength section of the light of an image; and an image sensor 180 at an image plane 170.

TABLE 1

Optical data of this preferred embodiment
f = 4.16 mm, Fno = 3.30, HFOV = 30.1 deg.

| Surface # | | Curvature Radius | Thickness | Material | Refractive Index | Abbe # | Focal length |
|---|---|---|---|---|---|---|---|
| 0 | Object | Plano | Infinity | | | | |
| 1 | Lens 1 | 1.713567 (ASP) | 0.567 | Glass | 1.501 | 56.4 | 3.23 |
| 2 | | −25.930948 (ASP) | 0.089 | | | | |
| 3 | Ape. Stop | Plano | 0.000 | | | | |
| 4 | Lens 2 | 3.729398 (ASP) | 0.345 | Plastic | 1.634 | 23.8 | −4.40 |
| 5 | | 1.539135 (ASP) | 0.249 | | | | |
| 6 | Lens 3 | −7.090384 (ASP) | 0.947 | Plastic | 1.530 | 55.8 | 4.21 |
| 7 | | −1.775592 (ASP) | 0.308 | | | | |
| 8 | Lens 4 | 100.000000 (ASP) | 0.300 | Plastic | 1.634 | 23.8 | 418.77 |
| 9 | | 160.236834 (ASP) | 0.576 | | | | |
| 10 | Lens 5 | 10.289682 (ASP) | 0.719 | Plastic | 1.535 | 56.3 | −4.02 |
| 11 | | 1.735935 (ASP) | 0.405 | | | | |
| 12 | IR-filter | Plano | 0.210 | Glass | 1.517 | 64.2 | — |
| 13 | | Plano | 0.380 | | | | |
| 14 | Image | Plano | — | | | | |

Note:
Reference wavelength is 587.6 nm. ASP stands for aspherical surfaces.

The optical data of this preferred embodiment are listed in Table 1, wherein the object-side surfaces and the image-side surfaces of the first lens element 110 to the fifth lens element 150 comply with the aspherical surface formula as given in Equation (18), and their aspheric coefficients are listed in Table 2 as follows:

TABLE 2

Aspheric coefficients of this preferred embodiment

| Surface # | 1 | 2 | 4 | 5 | 6 |
|---|---|---|---|---|---|
| k= | 9.04069E−01 | 2.00000E+01 | −6.76401E+00 | 1.40445E−01 | 1.40884E+01 |
| A4= | 8.57356E−03 | 3.14879E−02 | −1.33083E−01 | −1.66380E−01 | −7.29051E−02 |
| A6= | 2.08151E−02 | 4.83939E−02 | 1.09647E−01 | 9.27633E−02 | −2.22736E−01 |
| A8= | −1.64952E−02 | −2.79857E−02 | −2.52001E−01 | −9.45802E−02 | 6.33991E−01 |
| A10= | 4.17866E−02 | −1.61557E−01 | 9.79423E−02 | −7.84081E−02 | −1.60572E+00 |
| A12= | −1.53887E−02 | 1.78708E−01 | 6.82109E−02 | 2.17772E−01 | 1.09256E+00 |

| Surface # | 7 | 8 | 9 | 10 | 11 |
|---|---|---|---|---|---|
| k= | −1.34202E+00 | −1.00000E+02 | 1.00000E+02 | 8.50521E−01 | −7.15144E+00 |
| A4= | −1.28004E−01 | −3.10278E−02 | −1.50569E−02 | −2.72257E−01 | −1.14728E−01 |
| A6= | −4.62429E−02 | −6.90559E−02 | −3.78177E−02 | 6.26001E−02 | 3.84200E−02 |
| A8= | 1.77378E−02 | 7.79599E−02 | 7.14367E−02 | 1.25585E−02 | −9.14179E−03 |
| A10= | 2.89116E−03 | −2.02773E−02 | −4.66000E−02 | −9.07807E−03 | 7.12124E−04 |
| A12= | −3.02972E−02 | −1.21080E−02 | 1.24130E−02 | −3.42448E−03 | 5.76463E−05 |
| A14= | | 6.54156E−03 | −6.52488E−04 | 6.53605E−06 | −1.98624E−05 |
| A16= | | | | 1.64052E−04 | 1.43258E−06 |

With reference to Table 1 and FIG. 1B for an optical imaging lens assembly of this preferred embodiment, the optical imaging lens assembly has a focal length f=4.16 (mm), an f-number Fno=3.30, and a half of maximum view angle HFOV=30.1°. After the optical data of this preferred embodiment are calculated and derived, the optical imaging system for pickup satisfies related conditions as shown in Table 3 below, and the related symbols have been described above and thus will not be described again.

TABLE 3

Data of related relations of this preferred embodiment

| Relation | Data | Relation | Data |
|---|---|---|---|
| V1 − V2 | 32.6 | R10/CT5 | 2.41 |
| V3 − V4 | 32.0 | f/R9 | 0.40 |

TABLE 3-continued

Data of related relations of this preferred embodiment

| Relation | Data | Relation | Data |
|---|---|---|---|
| T23/T34 | 0.81 | f/f$_3$ | 0.99 |
| (R1 + R2)/(R1 − R2) | −0.88 | Sd/Td | 0.84 |
| R4/R3 | 0.41 | TTL/ImgH | 2.04 |
| R$_6$/CT$_3$ | −1.88 | | |

According to the optical data as shown in Table 1 and the series of aberration curves as shown in FIG. 1B, the optical imaging lens assembly in accordance with this preferred embodiment of the present disclosure provides good correction results in aspects of the longitudinal spherical aberration, astigmatic field curving, and distortion.

Second Preferred Embodiment

Figure 2A:
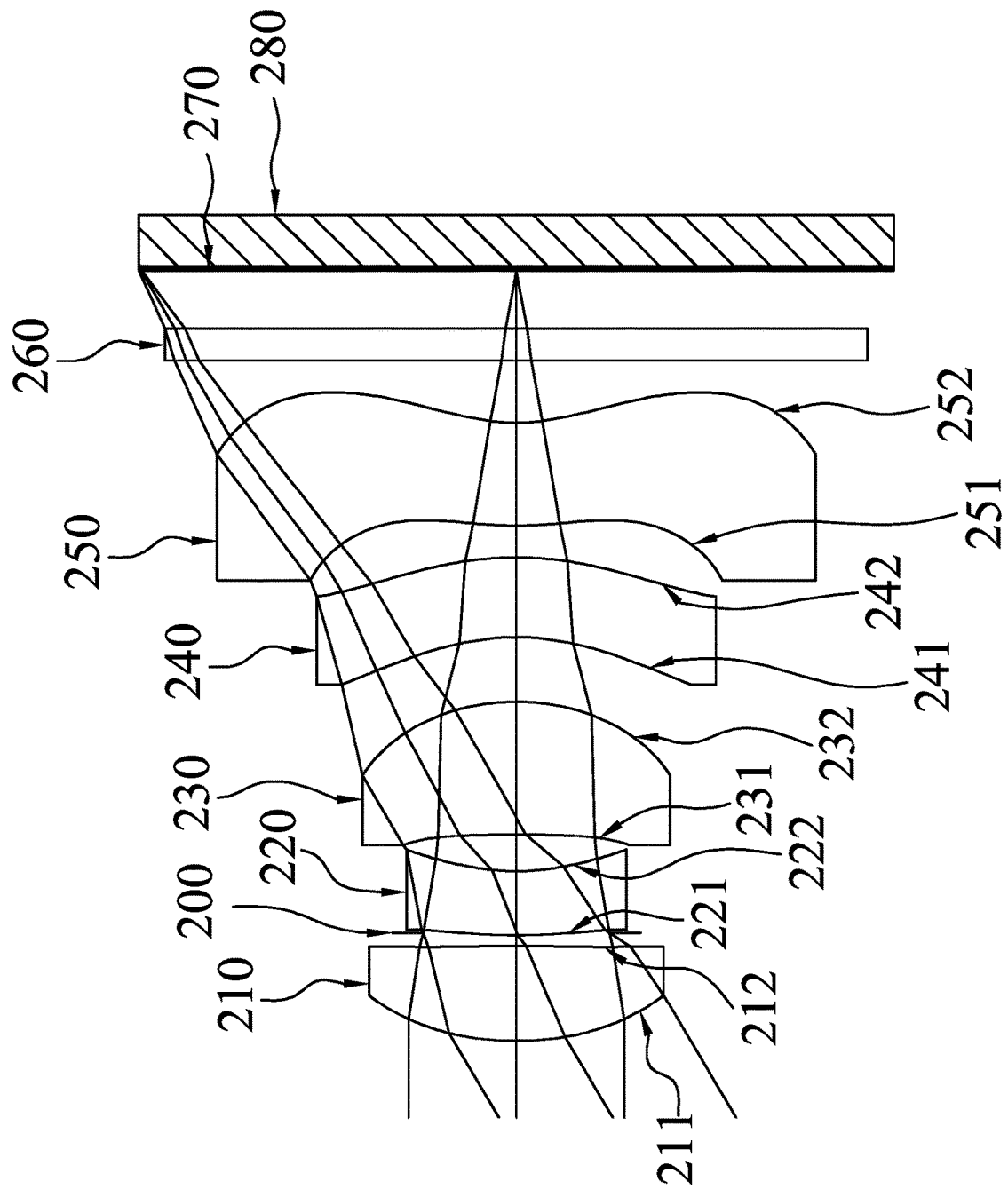
FIG. 2A is a schematic view of an optical imaging lens assembly in accordance with the second preferred embodiment of the present disclosure.
Figure 2B:
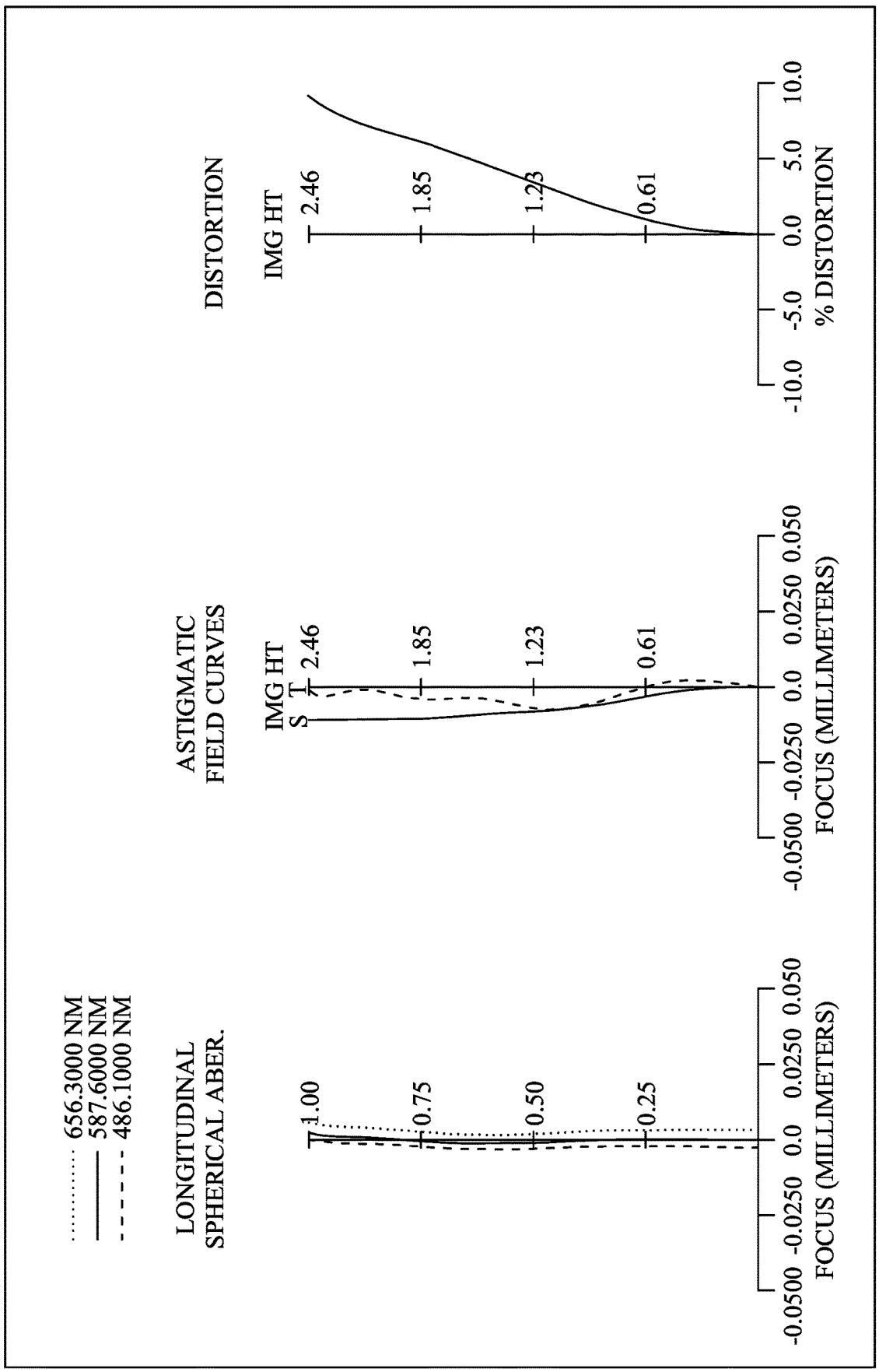
FIG. 2B is a schematic view of a series of aberration curves of the second preferred embodiment of the present disclosure.

With reference to FIGS. 2A and 2B for a schematic view and a series of aberration curves of an optical imaging lens assembly in accordance with the second preferred embodiment of the present disclosure respectively, the optical imaging lens assembly, sequentially arranged from an object side to an image side along an optical axis, comprises: a first lens element 210 with positive refractive power having a convex object-side surface 211 and a convex image-side surface 212, both being aspheric; a stop, which here is an aperture stop 200, and made of plastic; a second lens element 220 with negative refractive power having a convex object-side surface 221 and a concave image-side surface 222, both being aspheric, and made of plastic; a third lens element 230 with positive refractive power having a concave object-side surface 231 and a convex image-side surface 232, both being aspheric, and made of plastic; a fourth lens element 240 with negative refractive power having a concave object-side surface 241 and a convex image-side surface 242, both being aspheric, and made of plastic; a fifth lens element 250 with negative refractive power having a convex object-side surface 251 and a concave image-side surface 252, both being aspheric and having at least one inflection point, and made of plastic; an IR-filter 260 made of panel glass for adjusting a wavelength section of the light of an image; and an image sensor 280 at an image plane 270.

TABLE 4

Optical data of this preferred embodiment
f = 3.82 mm, Fno = 2.70, HFOV = 30.6 deg.

| Surface # | | Curvature Radius | Thickness | Material | Refractive Index | Abbe # | Focal length |
|---|---|---|---|---|---|---|---|
| 0 | Object | Plano | Infinity | | | | |
| 1 | Lens 1 | 1.932066 (ASP) | 0.626 | Plastic | 1.530 | 55.8 | 3.31 |
| 2 | | −17.003581 (ASP) | 0.085 | | | | |
| 3 | Ape. Stop | Plano | −0.015 | | | | |
| 4 | Lens 2 | 3.714753 (ASP) | 0.421 | Plastic | 1.634 | 23.8 | −4.61 |
| 5 | | 1.563196 (ASP) | 0.240 | | | | |
| 6 | Lens 3 | −11.121554 (ASP) | 0.872 | Plastic | 1.544 | 55.9 | 3.05 |
| 7 | | −1.485010 (ASP) | 0.424 | | | | |
| 8 | Lens 4 | −1.484687 (ASP) | 0.521 | Plastic | 1.614 | 25.6 | −12.22 |
| 9 | | −2.098129 (ASP) | 0.209 | | | | |
| 10 | Lens 5 | 2.467793 (ASP) | 0.678 | Plastic | 1.535 | 56.3 | −6.29 |
| 11 | | 1.287251 (ASP) | 0.405 | | | | |
| 12 | IR-filter | Plano | 0.210 | Glass | 1.517 | 64.2 | — |
| 13 | | Plano | 0.381 | | | | |
| 14 | Image | Plano | — | | | | |

Note:
Reference wavelength is 587.6 nm. ASP stands for aspherical surfaces.

The optical data of this preferred embodiment are listed in Table 4, wherein the object-side surfaces and the image-side surfaces of the first lens element 210 to the fifth lens element 250 comply with the aspherical surface formula as given in Equation (18), and their aspheric coefficients are listed in Table 5 as follows:

TABLE 5

Aspheric coefficients of this preferred embodiment

| Surface # | 1 | 2 | 4 | 5 | 6 |
|---|---|---|---|---|---|
| k= | 8.79814E−01 | 1.51889E+01 | −4.26992E+00 | 6.17090E−02 | −8.63667E+00 |
| A4= | 1.00962E−02 | 2.56148E−02 | −1.26347E−01 | −1.69485E−01 | −8.04247E−02 |
| A6= | 1.89016E−02 | 5.49516E−02 | 1.28281E−01 | 9.13251E−02 | −2.48673E−01 |
| A8= | −2.07038E−02 | 8.76055E−03 | −2.10163E−01 | −5.96734E−02 | 7.78747E−01 |
| A10= | 4.04248E−02 | −1.82610E−01 | 1.06085E−01 | −8.38859E−02 | −1.75607E+00 |
| A12= | −1.66532E−02 | 1.36627E−01 | −7.78112E−02 | 1.65806E−01 | 1.31398E+00 |

| Surface # | 7 | 8 | 9 | 10 | 11 |
|---|---|---|---|---|---|
| k= | −2.50005E+00 | −7.94553E+00 | −9.46981E+00 | −1.53814E+01 | −5.43399E+00 |
| A4= | −1.11832E−01 | −2.68504E−02 | −1.83884E−02 | −2.18667E−01 | −1.09140E−01 |
| A6= | −6.83402E−02 | −5.95036E−02 | −3.35763E−02 | 2.89255E−02 | 3.58957E−02 |
| A8= | 1.93789E−02 | 8.09953E−02 | 7.43222E−02 | 1.60019E−02 | −8.47671E−03 |
| A10= | 1.02152E−02 | −1.93743E−02 | −4.56612E−02 | −5.43808E−03 | 6.27230E−04 |
| A12= | −3.04254E−02 | −1.24281E−02 | 1.24099E−02 | −2.54820E−03 | 5.61759E−05 |
| A14= | | 5.78229E−03 | −1.06900E−03 | −1.07278E−04 | −1.63681E−05 |
| A16= | | | | 4.38160E−05 | 6.91035E−07 |

With reference to Table 4 and FIG. 2B for an optical imaging lens assembly of this preferred embodiment, the optical imaging lens assembly has a focal length f=3.82 (mm), an f-number Fno=2.70, and a half of maximum view angle HFOV=30.6°. After the optical data of this preferred embodiment are calculated and derived, the optical imaging system for pickup satisfies related conditions as shown in Table 6 below, and the related symbols have been described above and thus will not be described again.

TABLE 6

Data of related relations of this preferred embodiment

| Relation | Data | Relation | Data |
| --- | --- | --- | --- |
| V1 − V2 | 32.0 | R10/CT5 | 1.90 |
| V3 − V4 | 30.3 | f/R9 | 1.55 |
| T23/T34 | 0.57 | f/f$_3$ | 1.25 |
| (R1 + R2)/(R1 − R2) | −0.80 | Sd/Td | 0.83 |
| R4/R3 | 0.42 | TTL/ImgH | 2.03 |
| R$_6$/CT$_3$ | −1.70 | | |

According to the optical data as shown in Table 4 and the series of aberration curves as shown in FIG. 2B, the optical imaging lens assembly in accordance with this preferred embodiment of the present disclosure provides good correction results in aspects of the longitudinal spherical aberration, astigmatic field curving, and distortion.

Third Preferred Embodiment

Figure 3A:
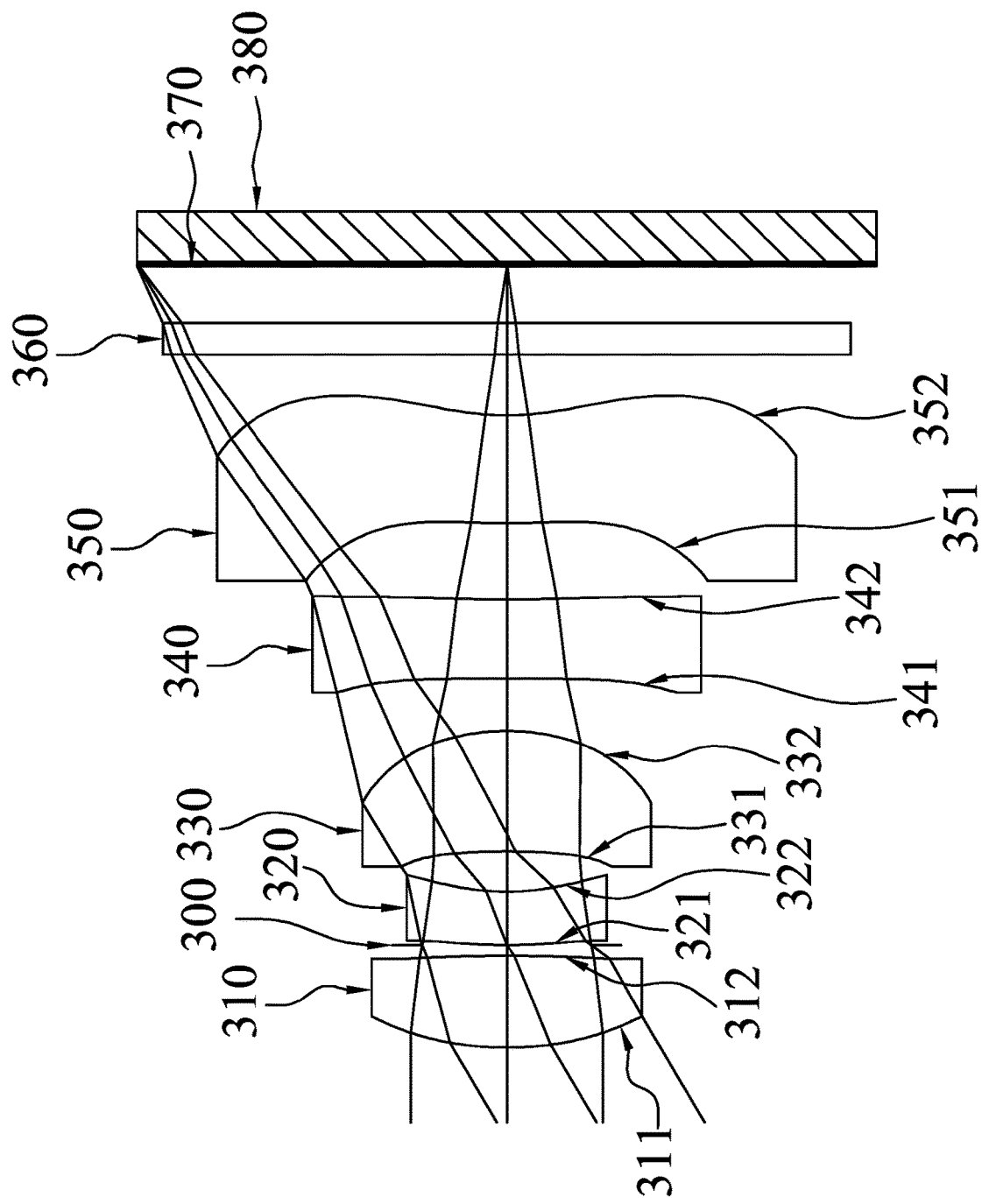
FIG. 3A is a schematic view of an optical imaging lens assembly in accordance with the third preferred embodiment of the present disclosure.
Figure 3B:
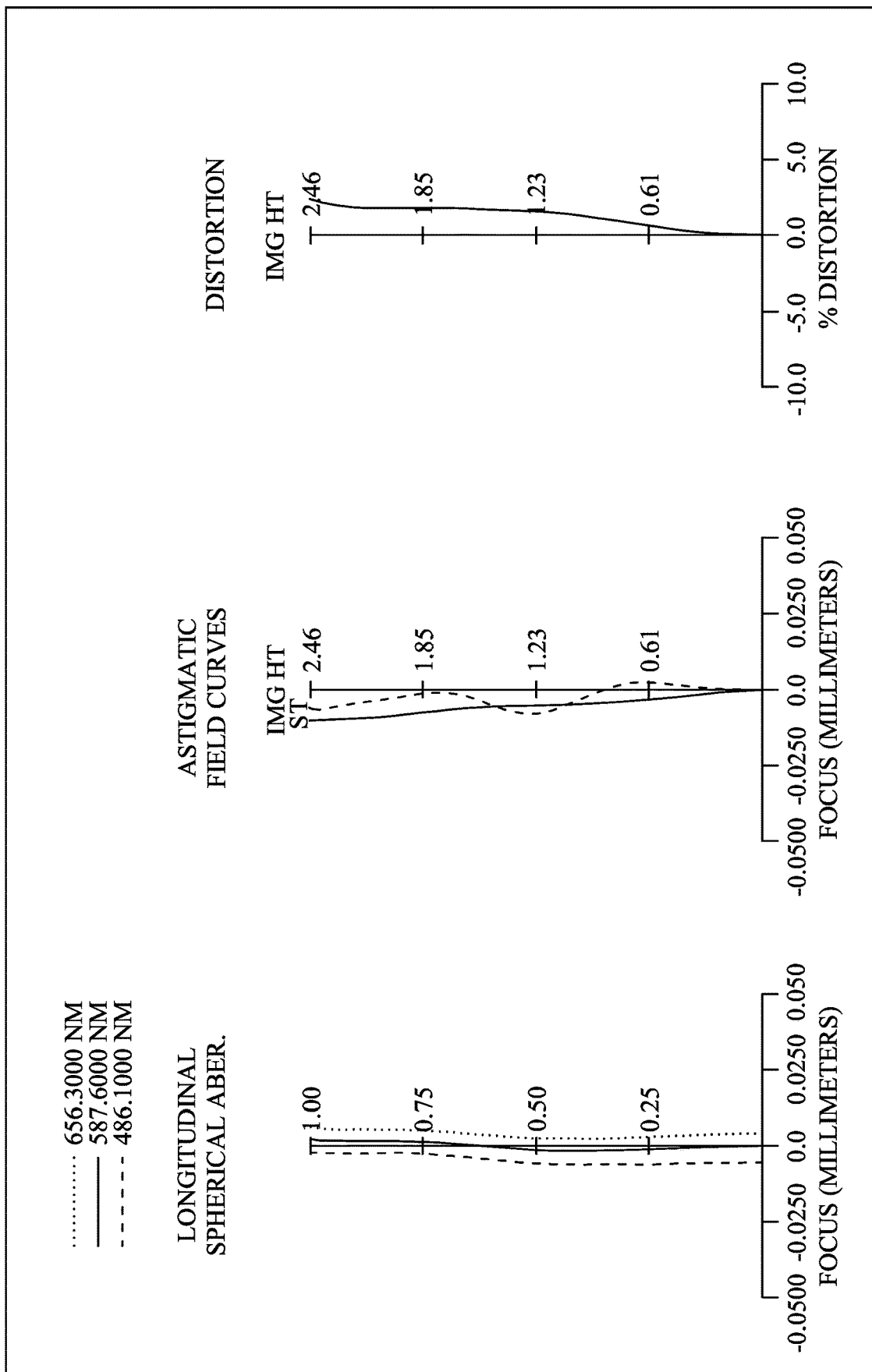
FIG. 3B is a schematic view of a series of aberration curves of the third preferred embodiment of the present disclosure.

With reference to FIGS. 3A and 3B for a schematic view and a series of aberration curves of an optical imaging lens assembly in accordance with the third preferred embodiment of the present disclosure respectively, the optical imaging lens assembly, sequentially arranged from an object side to an image side along an optical axis, comprises: a first lens element 310 with positive refractive power having a convex object-side surface 311 and a convex image-side surface 312, both being aspheric, and made of plastic; a stop, which here is an aperture stop 300; a second lens element 320 with negative refractive power having a convex object-side surface 321 and a concave image-side surface 322, both being aspheric, and made of plastic; a third lens element 330 with positive refractive power having a concave object-side surface 331 and a convex image-side surface 332, both being aspheric, and made of plastic; a fourth lens element 340 with negative refractive power having a convex object-side surface 341 and a concave image-side surface 342, both being aspheric, and made of plastic; a fifth lens element 350 with negative refractive power having a convex object-side surface 351 and a concave image-side surface 352, both being aspheric and having at least one inflection point, and made of plastic; an IR-filter 360 made of panel glass for adjusting a wavelength section of the light of an image; and an image sensor 380 at an image plane 370.

TABLE 7

Optical data of this preferred embodiment f = 4.10 mm, Fno = 3.20, HFOV = 30.4 deg.

| Surface # | | Curvature Radius | Thickness | Material | Refractive Index | Abbe # | Focal length |
| --- | --- | --- | --- | --- | --- | --- | --- |
| 0 | Object | Plano | Infinity | | | | |
| 1 | Lens 1 | 2.219824 (ASP) | 0.619 | Plastic | 1.535 | 56.3 | 3.46 |
| 2 | | −9.989920 (ASP) | 0.070 | | | | |
| 3 | Ape. Stop | Plano | 0.000 | | | | |
| 4 | Lens 2 | 3.679708 (ASP) | 0.357 | Plastic | 1.634 | 23.8 | −4.91 |
| 5 | | 1.622461 (ASP) | 0.268 | | | | |
| 6 | Lens 3 | −5.040810 (ASP) | 0.807 | Plastic | 1.535 | 56.3 | 3.90 |
| 7 | | −1.556671 (ASP) | 0.349 | | | | |
| 8 | Lens 4 | 77.297128 (ASP) | 0.530 | Plastic | 1.607 | 26.6 | −20.58 |
| 9 | | 10.732372 (ASP) | 0.511 | | | | |
| 10 | Lens 5 | 5.829793 (ASP) | 0.723 | Plastic | 1.535 | 56.3 | −5.06 |
| 11 | | 1.768374 (ASP) | 0.405 | | | | |
| 12 | IR-filter | Plano | 0.210 | Glass | 1.517 | 64.2 | — |
| 13 | | Plano | 0.381 | | | | |
| 14 | Image | Plano | — | | | | |

Note:
Reference wavelength is 587.6 nm. ASP stands for aspherical surfaces.

The optical data of this preferred embodiment are listed in Table 7, wherein the object-side surfaces and the image-side surfaces of the first lens element 310 to the fifth lens element 350 comply with the aspherical surface formula as given in Equation (18), and their aspheric coefficients are listed in Table 8 as follows:

TABLE 8

Aspheric coefficients of this preferred embodiment

| Surface # | 1 | 2 | 4 | 5 | 6 |
|---|---|---|---|---|---|
| k= | 7.91025E−01 | −1.50116E+01 | −7.16942E+00 | −1.64789E−01 | 1.98014E+01 |
| A4= | 1.34657E−02 | 1.76163E−02 | −1.35595E−01 | −1.78184E−01 | −7.40688E−02 |
| A6= | 7.45839E−03 | 2.19128E−02 | 7.08881E−02 | 4.92893E−02 | −2.79222E−01 |
| A8= | −7.47106E−03 | −3.53591E−02 | −1.58784E−01 | −5.13263E−01 | 7.50580E−01 |
| A10= | 2.81792E−02 | −1.74561E−01 | −9.92414E−03 | −6.08920E−02 | −2.12005E+00 |
| A12= | −3.08611E−02 | 1.86779E−01 | 1.20118E−01 | 2.05433E−01 | 1.61812E+00 |

| Surface # | 7 | 8 | 9 | 10 | 11 |
|---|---|---|---|---|---|
| k= | −1.26265E+00 | 9.91108E+02 | 2.42641E+01 | −4.58094E+00 | −6.22670E+00 |
| A4= | −1.31007E−01 | −4.50178E−02 | −3.16168E−02 | −2.36609E−01 | −1.11104E−01 |
| A6= | −7.18821E−02 | −6.79386E−02 | −3.81724E−02 | 4.09470E−02 | 3.32119E−02 |
| A8= | 1.70440E−02 | 7.61836E−02 | 7.30484E−02 | 1.58387E−02 | −6.85371E−03 |
| A10= | 6.40928E−03 | −2.12865E−02 | −4.61711E−02 | −4.42085E−03 | 4.05067E−04 |
| A12= | −5.28925E−02 | −1.29945E−02 | 1.24453E−02 | −2.56142E−03 | 4.54240E−05 |
| A14= | | 7.44290E−03 | −1.04168E−03 | −3.45591E−04 | −1.19253E−05 |
| A16= | | | | 1.90146E−04 | 4.96120E−07 |

With reference to Table 7 and FIG. 3B for an optical imaging lens assembly of this preferred embodiment, the optical imaging lens assembly has a focal length f=4.10 (mm), an f-number Fno=3.20, and a half of maximum view angle HFOV=30.4°. After the optical data of this preferred embodiment are calculated and derived, the optical imaging system for pickup satisfies related conditions as shown in Table 9 below, and the related symbols have been described above and thus will not be described again.

TABLE 9

Data of related relations of this preferred embodiment

| Relation | Data | Relation | Data |
|---|---|---|---|
| V1 − V2 | 32.5 | R10/CT5 | 2.45 |
| V3 − V4 | 29.7 | f/R9 | 0.70 |
| T23/T34 | 0.77 | f/f$_3$ | 1.05 |
| (R1 + R2)/(R1 − R2) | −0.64 | Sd/Td | 0.84 |
| R4/R3 | 0.44 | TTL/ImgH | 2.10 |
| R$_6$/CT$_3$ | −1.93 | | |

According to the optical data as shown in Table 7 and the series of aberration curves as shown in FIG. 3B, the optical imaging lens assembly in accordance with this preferred embodiment of the present disclosure provides good correction results in aspects of the longitudinal spherical aberration, astigmatic field curving, and distortion.

Fourth Preferred Embodiment

Figure 4A:
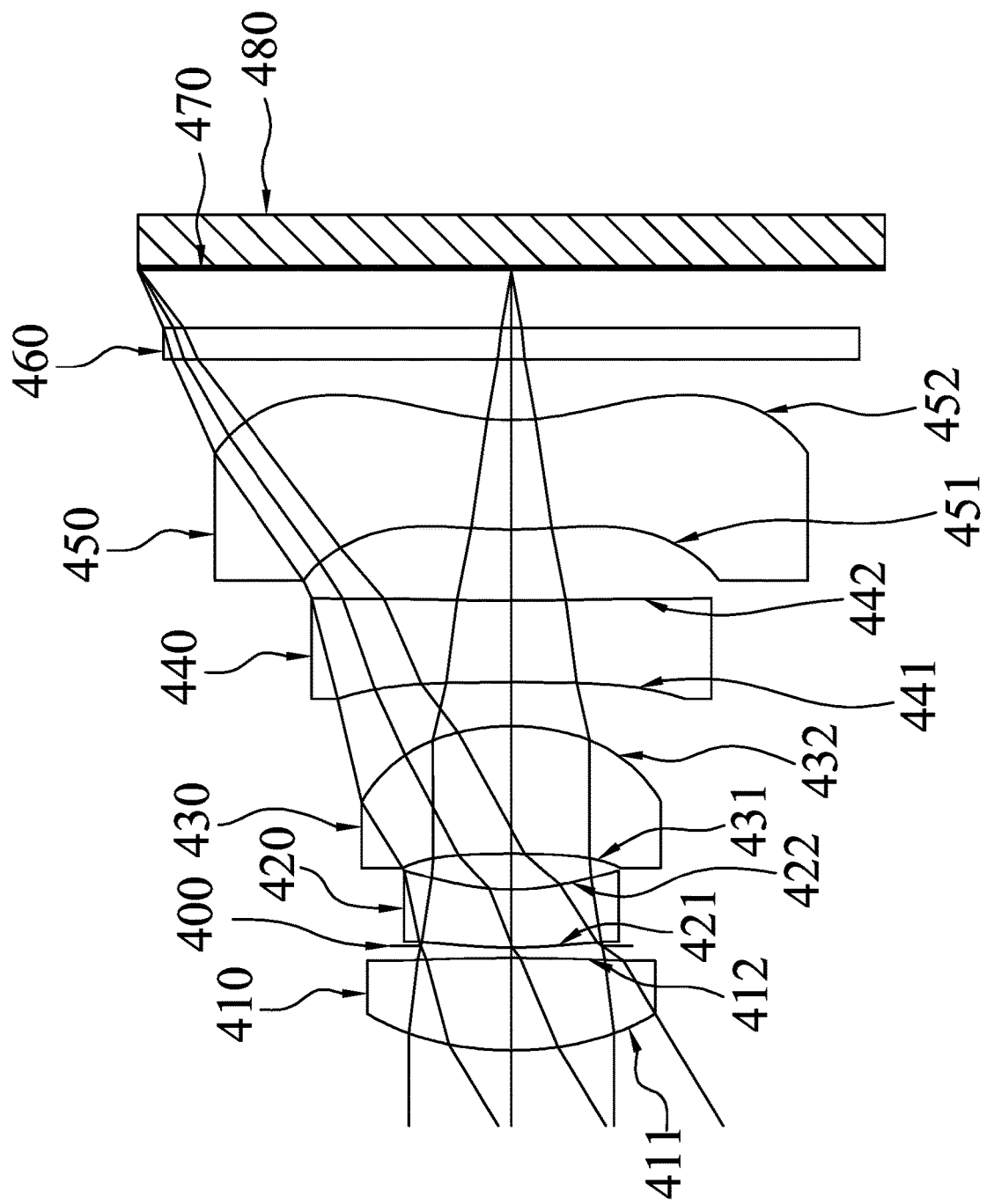
FIG. 4A is a schematic view of an optical imaging lens assembly in accordance with the fourth preferred embodiment of the present disclosure.
Figure 4B:
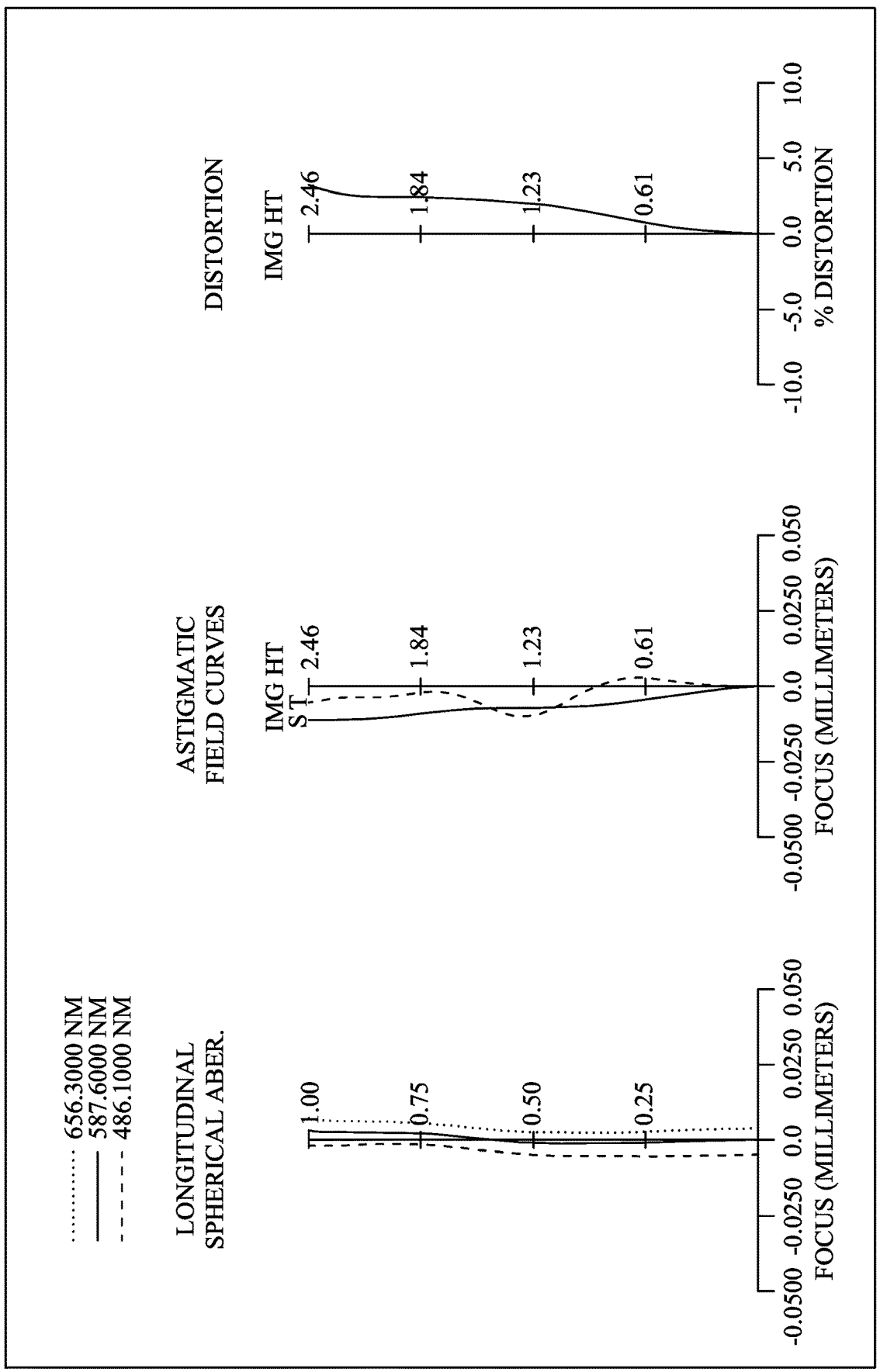
FIG. 4B is a schematic view of a series of aberration curves of the fourth preferred embodiment of the present disclosure.

With reference to FIGS. 4A and 4B for a schematic view and a series of aberration curves of an optical imaging lens assembly in accordance with the fourth preferred embodiment of the present disclosure respectively, the optical imaging lens assembly, sequentially arranged from an object side to an image side along an optical axis, comprises: a first lens element 410 with positive refractive power having a convex object-side surface 411 and a convex image-side surface 412, both being aspheric, and made of plastic; a stop, which here is an aperture stop 400; a second lens element 420 with negative refractive power having a convex object-side surface 421 and a concave image-side surface 422, both being aspheric, and made of plastic; a third lens element 430 with positive refractive power having a concave object-side surface 431 and a convex image-side surface 432, both being aspheric, and made of plastic; a fourth lens element 440 with negative refractive power having a concave object-side surface 441 and a concave image-side surface 442, both being aspheric, and made of plastic; a fifth lens element 450 with negative refractive power having a convex object-side surface 451 and a concave image-side surface 452, both being aspheric and having at least one inflection point, and made of plastic; an IR-filter 460 made of panel glass for adjusting a wavelength section of the light of an image; and an image sensor 480 at an image plane 470.

TABLE 10

Optical data of this preferred embodiment
f = 3.94 mm, Fno = 2.90, HFOV = 31.2 deg.

| Surface # | | Curvature Radius | Thickness | Material | Refractive Index | Abbe # | Focal length |
|---|---|---|---|---|---|---|---|
| 0 | Object | Plano | Infinity | | | | |
| 1 | Lens 1 | 2.220683 (ASP) | 0.611 | Plastic | 1.535 | 56.3 | 3.51 |
| 2 | | −11.032079 (ASP) | 0.080 | | | | |
| 3 | Ape. Stop | Plano | −0.010 | | | | |
| 4 | Lens 2 | 3.461312 (ASP) | 0.383 | Plastic | 1.634 | 23.8 | −4.89 |

TABLE 10-continued

Optical data of this preferred embodiment
f = 3.94 mm, Fno = 2.90, HFOV = 31.2 deg.

| Surface # | | Curvature Radius | Thickness | Material | Refractive Index | Abbe # | Focal length |
|---|---|---|---|---|---|---|---|
| 5 | | 1.565390 (ASP) | 0.240 | | | | |
| 6 | Lens 3 | −6.543694 (ASP) | 0.843 | Plastic | 1.535 | 56.3 | 3.74 |
| 7 | | −1.599168 (ASP) | 0.290 | | | | |
| 8 | Lens 4 | −39.366986 (ASP) | 0.545 | Plastic | 1.607 | 26.6 | −16.92 |
| 9 | | 13.982833 (ASP) | 0.469 | | | | |
| 10 | Lens 5 | 3.629229 (ASP) | 0.723 | Plastic | 1.535 | 56.3 | −6.05 |
| 11 | | 1.590994 (ASP) | 0.405 | | | | |
| 12 | IR-filter | Plano | 0.210 | Glass | 1.517 | 64.2 | — |
| 13 | | Plano | 0.381 | | | | |
| 14 | Image | Plano | — | | | | |

Note:
Reference wavelength is 587.6 nm. ASP stands for aspherical surfaces.

The optical data of this preferred embodiment are listed in Table 10, wherein the object-side surfaces and the image-side surfaces of the first lens element 410 to the fifth lens element 450 comply with the aspherical surface formula as given in Equation (18), and their aspheric coefficients are listed in Table 11 as follows:

TABLE 11

Aspheric coefficients of this preferred embodiment

| Surface # | 1 | 2 | 4 | 5 | 6 |
|---|---|---|---|---|---|
| k= | 8.16535E−01 | −2.00000E+01 | −5.11018E+00 | −1.30008E−01 | 2.00000E+01 |
| A4= | 1.37426E−02 | 1.99005E−02 | −1.30030E−01 | −1.77328E−01 | −8.03876E−02 |
| A6= | 8.19924E−03 | 3.42759E−02 | 9.27777E−02 | 5.69218E−02 | −2.81603E−01 |
| A8= | −8.11353E−03 | −1.40477E−02 | −1.50886E−01 | −4.42934E−02 | 7.84469E−01 |
| A10= | 3.19571E−02 | −1.71251E−01 | −2.12746E−02 | −7.32451E−02 | −2.04910E+00 |
| A12= | −2.73626E−02 | 1.47055E−01 | 8.65661E−02 | 1.54950E−01 | 1.51126E+00 |

| Surface # | 7 | 8 | 9 | 10 | 11 |
|---|---|---|---|---|---|
| k= | −1.31275E+00 | −6.17968E+03 | 4.68711E+01 | −2.78126E+00 | −4.78155E+00 |
| A4= | −1.29542E−01 | −4.27384E−02 | −2.67319E−02 | −2.38073E−01 | −1.13250E−01 |
| A6= | −7.01553E−02 | −6.70726E−02 | −3.74279E−02 | 3.64501E−02 | 3.37049E−02 |
| A8= | 2.03122E−02 | 7.67598E−02 | 7.28292E−02 | 1.75730E−02 | −6.84670E−03 |
| A10= | 1.07048E−02 | −2.11536E−02 | −4.63053E−02 | −3.61504E−03 | 4.18856E−04 |
| A12= | −4.67978E−02 | −1.29295E−02 | 1.23774E−02 | −2.58914E−03 | 4.19982E−05 |
| A14= | | 7.10019E−03 | −1.03624E−03 | −3.57369E−04 | −1.27808E−05 |
| A16= | | | | 2.06443E−04 | 8.04600E−07 |

With reference to Table 10 and FIG. 4B for an optical imaging lens assembly of this preferred embodiment, the optical imaging lens assembly has a focal length f=3.94 (mm), an f-number Fno=2.90, and a half of maximum view angle HFOV=31.2°. After the optical data of this preferred embodiment are calculated and derived, the optical imaging system for pickup satisfies related conditions as shown in Table 12 below, and the related symbols have been described above and thus will not be described again.

TABLE 12

Data of related relations of this preferred embodiment

| Relation | Data | Relation | Data |
|---|---|---|---|
| V1 − V2 | 32.5 | R10/CT5 | 2.20 |
| V3 − V4 | 29.7 | f/R9 | 1.09 |
| T23/T34 | 0.83 | f/f$_3$ | 1.05 |

TABLE 12-continued

Data of related relations of this preferred embodiment

| Relation | Data | Relation | Data |
|---|---|---|---|
| (R1 + R2)/(R1 − R2) | −0.66 | Sd/Td | 0.83 |
| R4/R3 | 0.45 | TTL/ImgH | 2.07 |
| R$_6$/CT$_3$ | −1.90 | | |

According to the optical data as shown in Table 10 and the series of aberration curves as shown in FIG. 4B, the optical imaging lens assembly in accordance with this preferred embodiment of the present disclosure provides good correction results in aspects of the longitudinal spherical aberration, astigmatic field curving, and distortion.

Fifth Preferred Embodiment

Figure 5A:
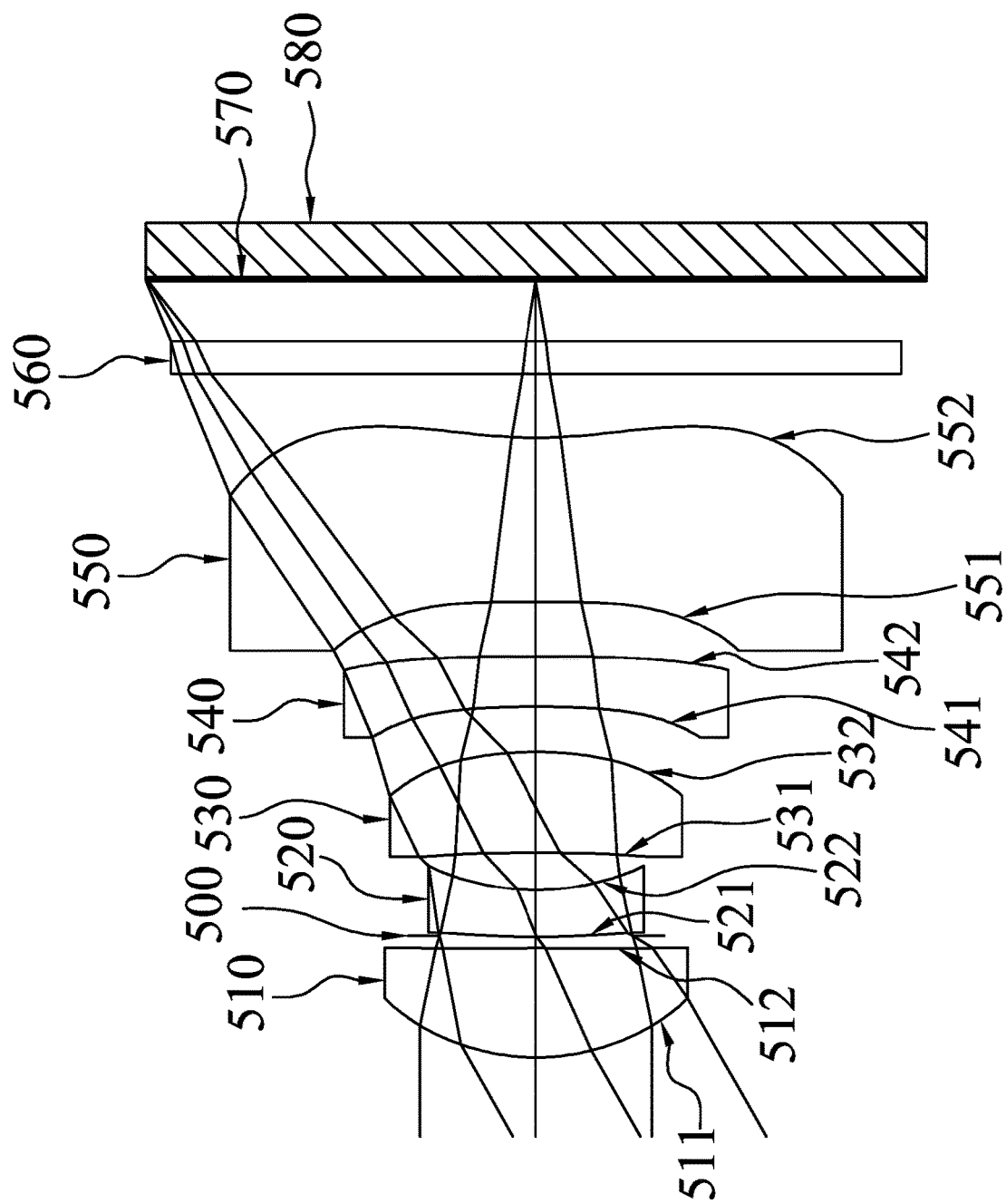
FIG. 5A is a schematic view of an optical imaging lens assembly in accordance with the fifth preferred embodiment of the present disclosure.
Figure 5B:
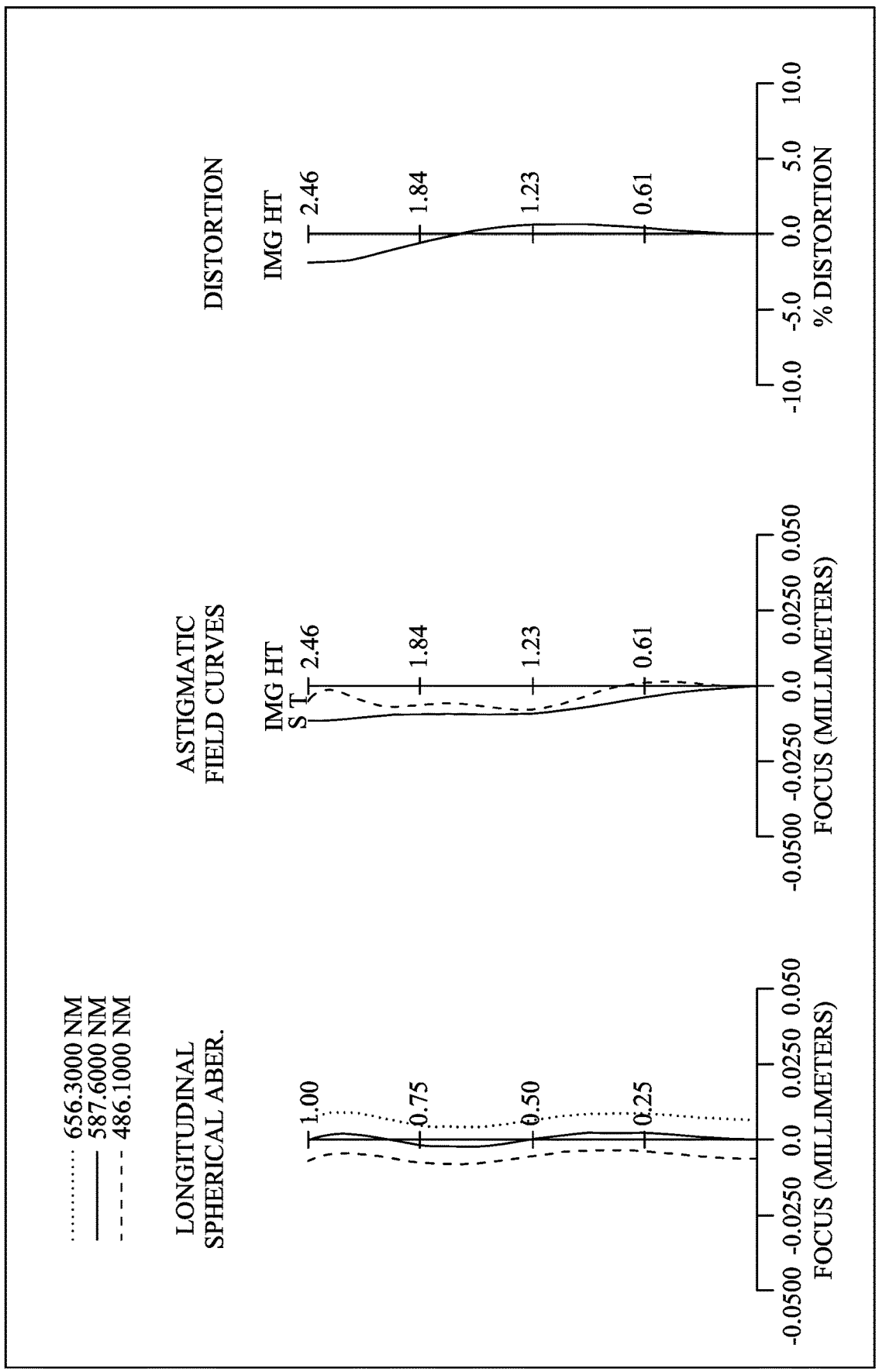
FIG. 5B is a schematic view of a series of aberration curves of the fifth preferred embodiment of the present disclosure.

With reference to FIGS. 5A and 5B for a schematic view and a series of aberration curves of an optical imaging lens assembly in accordance with the fifth preferred embodiment of the present disclosure respectively, the optical imaging lens assembly, sequentially arranged from an object side to an image side along an optical axis, comprises: a first lens element 510 with positive refractive power having a convex object-side surface 511 and a convex image-side surface 512, both being aspheric, and made of plastic; a stop, which here is an aperture stop 500; a second lens element 520 with negative refractive power having a convex object-side surface 521 and a concave image-side surface 522, both being aspheric, and made of plastic; a third lens element 530 with positive refractive power having a concave object-side surface 531 and a convex image-side surface 532, both being aspheric, and made of plastic; a fourth lens element 540 with negative refractive power having a concave object-side surface 541 and a convex image-side surface 542, both being aspheric, and made of plastic; a fifth lens element 550 with negative refractive power having a concave object-side surface 551 and a concave image-side surface 552, both being aspheric, the image-side surface 552 having at least one inflection point, and made of plastic; an IR-filter 560 made of panel glass for adjusting a wavelength section of the light of an image; and an image sensor 580 at an image plane 570.

TABLE 13

Optical data of this preferred embodiment
f = 4.41 mm, Fno = 3.00, HFOV = 29.6 deg.

| Surface # | | Curvature Radius | | Thickness | Material | Refractive Index | Abbe # | Focal length |
|---|---|---|---|---|---|---|---|---|
| 0 | Object | Plano | | Infinity | | | | |
| 1 | Lens 1 | 1.474619 | (ASP) | 0.691 | Plastic | 1.530 | 55.8 | 2.68 |
| 2 | | −31.833451 | (ASP) | 0.076 | | | | |
| 3 | Ape. Stop | Plano | | −0.006 | | | | |
| 4 | Lens 2 | 5.173336 | (ASP) | 0.300 | Plastic | 1.633 | 23.4 | −3.65 |
| 5 | | 1.559693 | (ASP) | 0.235 | | | | |
| 6 | Lens 3 | −25.532765 | (ASP) | 0.638 | Plastic | 1.583 | 30.2 | 4.88 |
| 7 | | −2.586935 | (ASP) | 0.288 | | | | |
| 8 | Lens 4 | −7.024586 | (ASP) | 0.318 | Plastic | 1.650 | 21.4 | −15.41 |
| 9 | | −23.959056 | (ASP) | 0.349 | | | | |
| 10 | Lens 5 | −75.757576 | (ASP) | 1.040 | Plastic | 1.535 | 56.3 | −5.49 |
| 11 | | 3.070010 | (ASP) | 0.405 | | | | |
| 12 | IR-filter | Plano | | 0.210 | Glass | 1.517 | 64.2 | — |
| 13 | | Plano | | 0.381 | | | | |
| 14 | Image | Plano | | — | | | | |

Note:
Reference wavelength is 587.6 nm. ASP stands for aspherical surfaces.

The optical data of this preferred embodiment are listed in Table 13, wherein the object-side surfaces and the image-side surfaces of the first lens element 510 to the fifth lens element 550 comply with the aspherical surface formula as given in Equation (18), and their aspheric coefficients are listed in Table 14 as follows:

TABLE 14

Aspheric coefficients of this preferred embodiment

| Surface # | 1 | 2 | 4 | 5 | 6 |
|---|---|---|---|---|---|
| k= | 5.38544E−01 | 2.00000E+01 | 4.99528E−01 | 7.89119E−01 | −2.00000E+01 |
| A4= | −1.81825E−02 | 3.72594E−03 | −1.23546E−01 | −1.29272E−01 | −5.27055E−02 |
| A6= | 7.92447E−03 | 7.22325E−02 | 2.22521E−01 | 1.57905E−01 | −1.52118E−01 |
| A8= | −4.47842E−02 | 1.57575E−02 | −2.56299E−01 | −5.57670E−03 | 6.02143E−01 |
| A10= | 5.74699E−02 | −1.80098E−01 | 1.01947E−01 | −1.01245E−01 | −1.25652E+00 |
| A12= | −2.70587E−02 | 1.31935E−01 | −6.30382E−02 | 2.36824E−01 | 1.36627E+00 |

| Surface # | 7 | 8 | 9 | 10 | 11 |
|---|---|---|---|---|---|
| k= | −2.56133E+00 | −9.85755E+01 | 9.29133E+01 | 1.00000E+02 | −6.14059E+00 |
| A4= | −1.25975E−01 | −7.58045E−02 | −1.31939E−02 | −1.72919E−01 | −9.69126E−02 |
| A6= | −6.79790E−02 | −1.00251E−01 | −4.09038E−02 | 5.16841E−02 | 2.94801E−02 |
| A8= | 2.80233E−02 | 7.46284E−02 | 6.75250E−02 | 8.13055E−03 | −8.08567E−03 |
| A10= | 1.24002E−02 | −1.62710E−02 | −4.79143E−02 | −8.47219E−03 | 8.85424E−04 |
| A12= | −6.51218E−03 | −9.70294E−03 | 1.25041E−02 | −2.28012E−03 | 4.72844E−05 |
| A14= | | 6.72061E−03 | −4.50138E−04 | 5.26238E−04 | −2.52045E−05 |
| A16= | | | | 1.59268E−04 | 1.92721E−06 |

With reference to Table 13 and FIG. 5B for an optical imaging lens assembly of this preferred embodiment, the optical imaging lens assembly has a focal length f=4.41 (mm), an f-number Fno=3.00, and a half of maximum view angle HFOV=29.6°. After the optical data of this preferred embodiment are calculated and derived, the optical imaging system for pickup satisfies related conditions as shown in Table 15 below, and the related symbols have been described above and thus will not be described again.

TABLE 15

Data of related relations of this preferred embodiment

| Relation | Data | Relation | Data |
|---|---|---|---|
| V1 − V2 | 32.4 | R10/CT5 | 2.95 |
| V3 − V4 | 8.8 | f/R9 | −0.06 |
| T23/T34 | 0.81 | f/f$_3$ | 0.90 |
| (R1 + R2)/(R1 − R2) | −0.91 | Sd/Td | 0.80 |
| R4/R3 | 0.30 | TTL/ImgH | 1.97 |
| R$_6$/CT$_3$ | −4.05 | | |

According to the optical data as shown in Table 13 and the series of aberration curves as shown in FIG. 5B, the optical imaging lens assembly in accordance with this preferred embodiment of the present disclosure provides good correction results in aspects of the longitudinal spherical aberration, astigmatic field curving, and distortion.

Sixth Preferred Embodiment

Figure 6A:
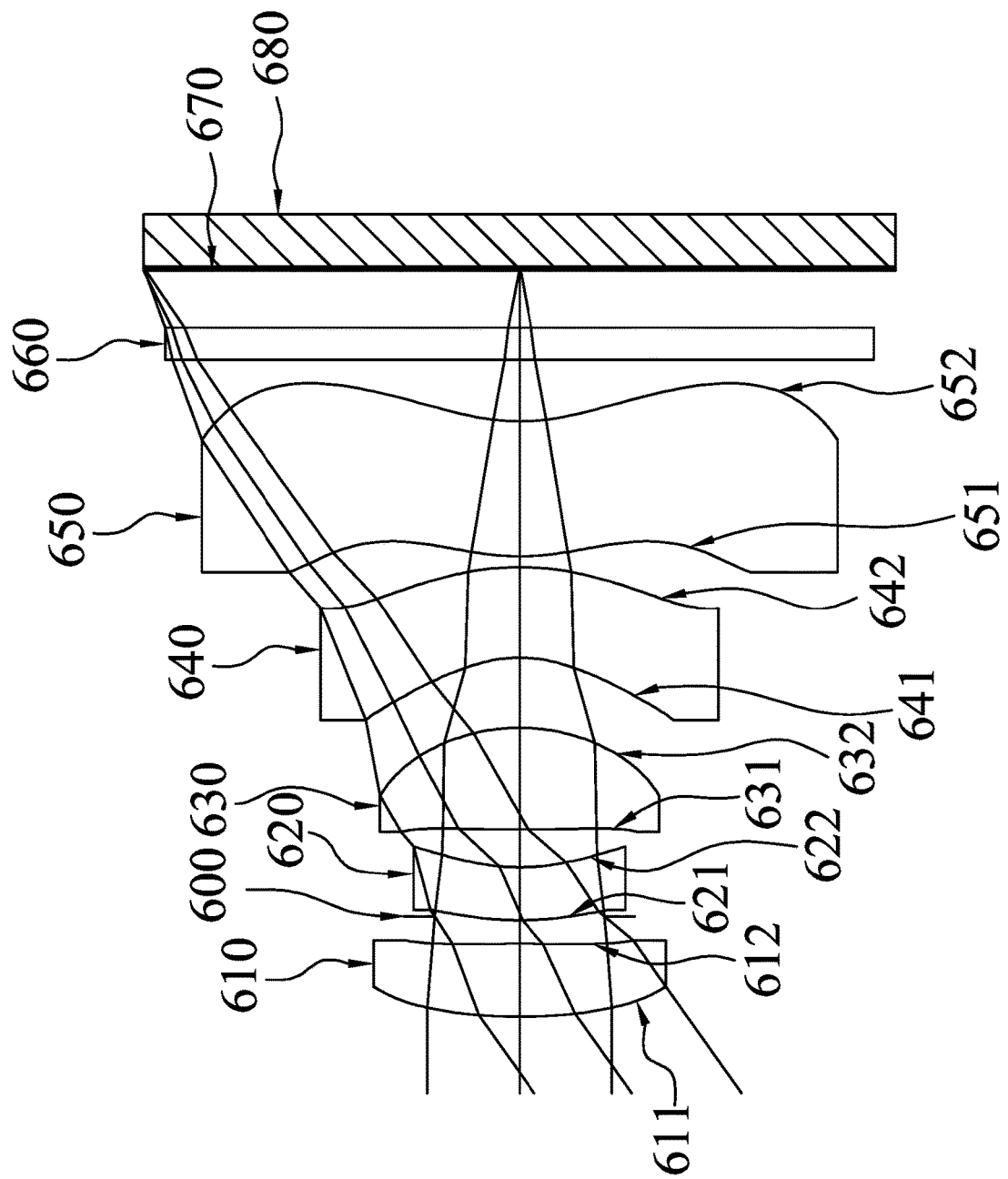
FIG. 6A is a schematic view of an optical imaging lens assembly in accordance with the sixth preferred embodiment of the present disclosure.
Figure 6B:
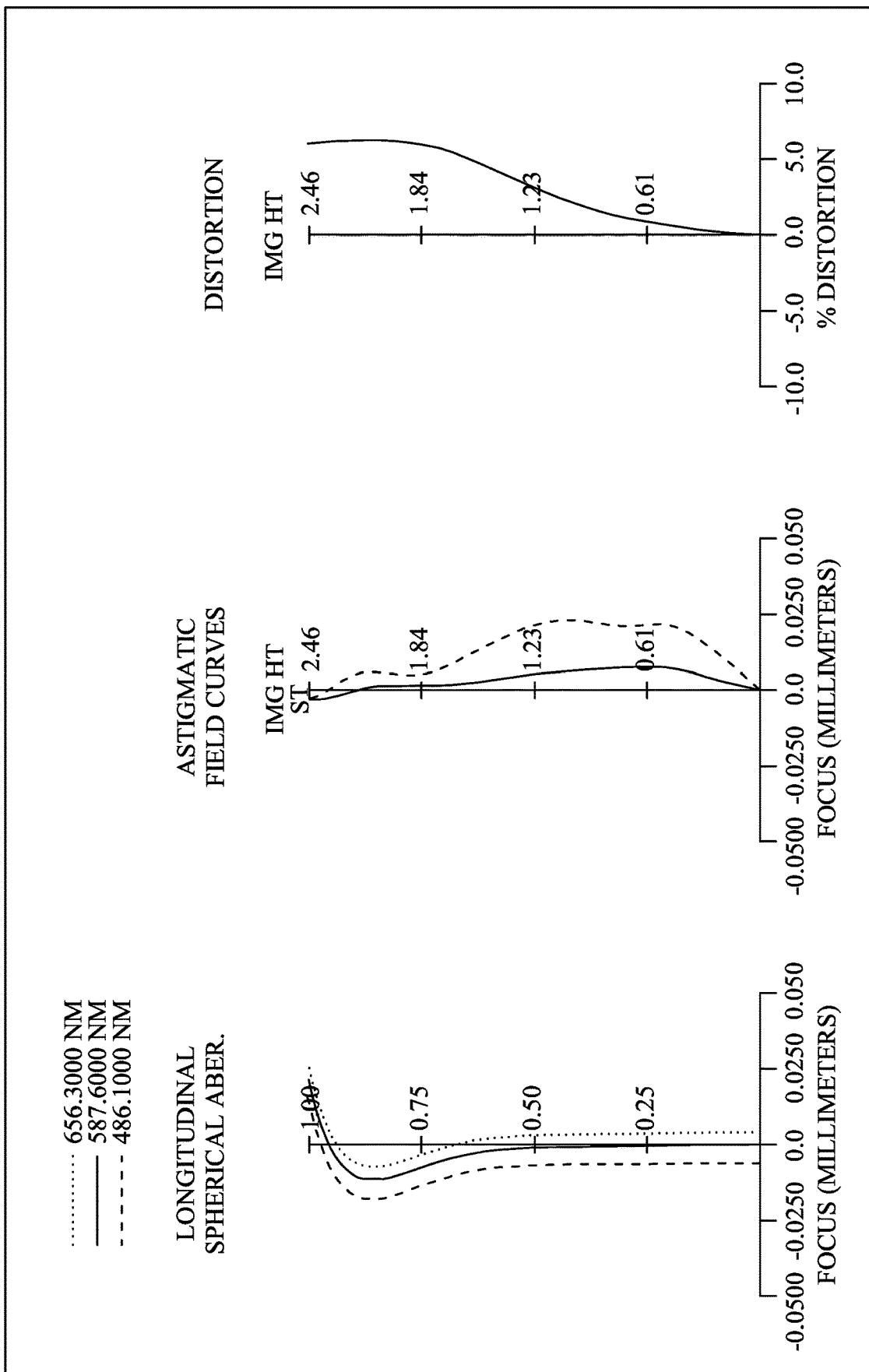
FIG. 6B is a schematic view of a series of aberration curves of the sixth preferred embodiment of the present disclosure.

With reference to FIGS. 6A and 6B for a schematic view and a series of aberration curves of an optical imaging lens assembly in accordance with the sixth preferred embodiment of the present disclosure respectively, the optical imaging lens assembly, sequentially arranged from an object side to an image side along an optical axis, comprises: the first lens element 610 with positive refractive power having a convex object-side surface 611 and a convex image-side surface 612, both being aspheric, and made of plastic; a stop, which here is an aperture stop 600; the second lens element 620 with negative refractive power having a convex object-side surface 621 and a concave image-side surface 622, both being aspheric, and made of plastic; the third lens element 630 with positive refractive power having a convex object-side surface 631 and a convex image-side surface 632, both being aspheric, and made of plastic; the fourth lens element 640 with negative refractive power having a concave object-side surface 641 and a convex image-side surface 642, both being aspheric, and made of plastic; the fifth lens element 650 with positive refractive power having a convex object-side surface 651 and a concave image-side surface 652, both being aspheric and having at least one inflection point, and made of plastic; an IR-filter 660 made of panel glass for adjusting a wavelength section of the light of an image; and an image sensor 680 at an image plane 670.

TABLE 16

Optical data of this preferred embodiment f = 3.26 mm, Fno = 2.70, HFOV = 35.5 deg.

| Surface # | | Curvature Radius | Thickness | Material | Refractive Index | Abbe # | Focal length |
|---|---|---|---|---|---|---|---|
| 0 | Object | Plano | Infinity | | | | |
| 1 | Lens 1 | 3.722397 (ASP) | 0.475 | Plastic | 1.530 | 55.8 | 5.84 |
| 2 | | −17.564458 (ASP) | 0.179 | | | | |
| 3 | Ape. Stop | Plano | −0.025 | | | | |
| 4 | Lens 2 | 2.039145 (ASP) | 0.350 | Plastic | 1.634 | 23.8 | −8.08 |
| 5 | | 1.361101 (ASP) | 0.248 | | | | |
| 6 | Lens 3 | 9.118799 (ASP) | 0.664 | Plastic | 1.535 | 56.3 | 2.13 |
| 7 | | −1.270115 (ASP) | 0.459 | | | | |
| 8 | Lens 4 | −0.841349 (ASP) | 0.595 | Plastic | 1.607 | 26.6 | −3.42 |
| 9 | | −1.791941 (ASP) | 0.070 | | | | |
| 10 | Lens 5 | 1.409477 (ASP) | 0.884 | Plastic | 1.535 | 56.3 | 16.37 |
| 11 | | 1.312832 (ASP) | 0.405 | | | | |
| 12 | IR-filter | Plano | 0.210 | Glass | 1.517 | 64.2 | — |
| 13 | | Plano | 0.375 | | | | |
| 14 | Image | Plano | — | | | | |

Note:
Reference wavelength is 587.6 nm. ASP stands for aspherical surfaces.

The optical data of this preferred embodiment are listed in Table 16, wherein the object-side surfaces and the image-side surfaces of the first lens element 610 to the fifth lens element 650 comply with the aspherical surface formula as given in Equation (18), and their aspheric coefficients are listed in Table 17 as follows:

TABLE 17

Aspheric coefficients of this preferred embodiment

| Surface # | 1 | 2 | 4 | 5 | 6 |
|---|---|---|---|---|---|
| k= | 3.02221E+00 | −2.00000E+01 | 1.81589E+00 | −1.27614E+00 | 2.00000E+01 |
| A4= | 4.25961E−02 | 9.38867E−02 | −1.81055E−01 | −2.06402E−01 | −7.57190E−02 |
| A6= | 2.03079E−02 | 8.41057E−02 | 1.03442E−01 | 1.84377E−01 | −1.20910E−01 |
| A8= | 1.95642E−02 | −1.77362E−01 | −5.01006E−01 | −3.88595E−01 | 3.23539E−01 |
| A10= | −2.17286E−02 | 2.89712E−01 | 1.29555E+00 | 6.12348E−01 | −8.06574E−01 |
| A12= | 2.36549E−02 | −1.39804E−01 | −2.12119E+00 | −5.12463E−01 | 5.46858E−01 |

| Surface # | 7 | 8 | 9 | 10 | 11 |
|---|---|---|---|---|---|
| k= | −3.94719E+00 | −5.00628E+00 | −3.39387E+00 | −9.28897E+00 | −5.66396E+00 |
| A4= | −1.84232E−01 | −1.21106E−01 | −1.75358E−04 | −1.54067E−01 | −7.13963E−02 |
| A6= | −1.24669E−01 | 9.77620E−03 | −3.78529E−01 | 1.44772E−02 | 2.19512E−02 |
| A8= | 1.65269E−01 | 1.06136E−01 | 7.96447E−02 | 2.23371E−01 | −5.12878E−03 |
| A10= | −3.70162E−02 | −3.17441E−02 | −4.12473E−02 | −1.56705E−02 | 1.92539E−04 |
| A12= | −1.64329E−01 | −3.05174E−02 | 1.30703E−02 | 1.09028E−03 | 5.05435E−05 |
| A14= | | −3.08256E−03 | −2.40600E−03 | 2.42550E−03 | 2.59295E−06 |
| A16= | | | | −5.78299E−04 | −1.48388E−06 |

With reference to Table 16 and FIG. 6B for an optical imaging lens assembly of this preferred embodiment, the optical imaging lens assembly has a focal length f=3.26 (mm), an f-number Fno=2.70, and a half of maximum view angle HFOV=35.5°. After the optical data of this preferred embodiment are calculated and derived, the optical imaging system for pickup satisfies related conditions as shown in Table 18 below, and the related symbols have been described above and thus will not be described again.

TABLE 18

Data of related relations of this preferred embodiment

| Relation | Data | Relation | Data |
|---|---|---|---|
| V1 − V2 | 32.0 | R10/CT5 | 1.48 |
| V3 − V4 | 29.7 | f/R9 | 2.31 |
| T23/T34 | 0.54 | f/f$_3$ | 1.53 |
| (R1 + R2)/(R1 − R2) | −0.65 | Sd/Td | 0.83 |
| R4/R3 | 0.67 | TTL/ImgH | 1.96 |
| R$_6$/CT$_3$ | −1.91 | | |

According to the optical data as shown in Table 16 and the series of aberration curves as shown in FIG. 6B, the optical imaging lens assembly in accordance with this preferred embodiment of the present disclosure provides good correction results in aspects of the longitudinal spherical aberration, astigmatic field curving, and distortion.

Seventh Preferred Embodiment

Figure 7A:
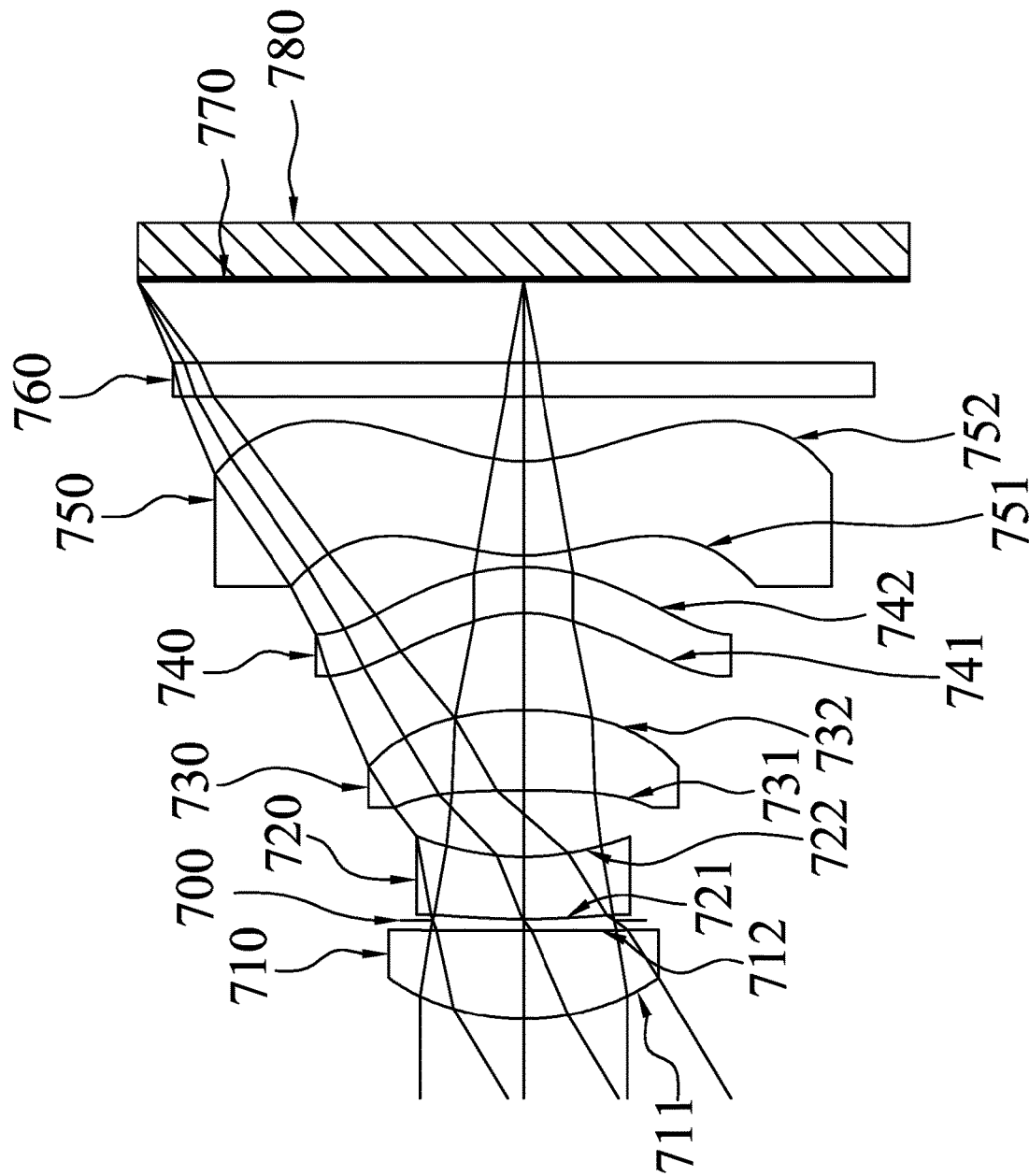
FIG. 7A is a schematic view of an optical imaging lens assembly in accordance with the seventh preferred embodiment of the present disclosure.
Figure 7B:
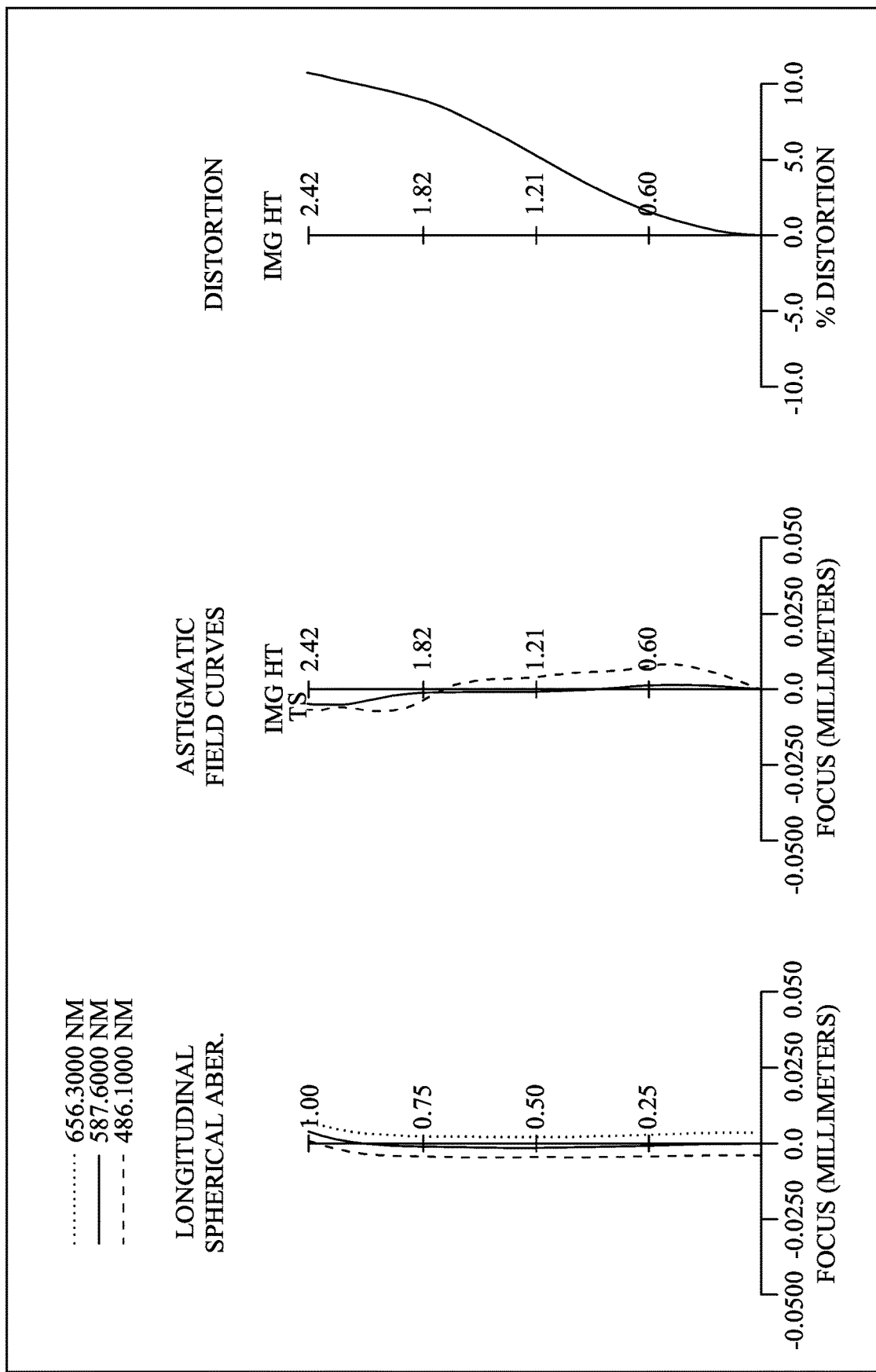
FIG. 7B is a schematic view of a series of aberration curves of the seventh preferred embodiment of the present disclosure.

With reference to FIGS. 7A and 7B for a schematic view and a series of aberration curves of an optical imaging lens assembly in accordance with the seventh preferred embodiment of the present disclosure respectively, the optical imaging lens assembly, sequentially arranged from an object side to an image side along an optical axis, comprises: the first lens element 710 with positive refractive power having a convex object-side surface 711 and a convex image-side surface 712, both being aspheric, and made of plastic; a stop, which here is an aperture stop 700; the second lens element 720 with negative refractive power having a convex object-side surface 721 and a concave image-side surface 722, both being aspheric, and made of plastic; the third lens element 730 with positive refractive power having a concave object-side surface 731 and a convex image-side surface 732, both being aspheric, and made of plastic; the fourth lens element 740 with negative refractive power having a concave object-side surface 741 and a convex image-side surface 742, both being aspheric, and made of plastic; the fifth lens element 750 with positive refractive power having a convex object-side surface 751 and a concave image-side surface 752, both being aspheric and having at least one inflection point, and made of plastic; an IR-filter 760 made of panel glass for adjusting a wavelength section of the light of an image; and an image sensor 780 at an image plane 770.

TABLE 19

Optical data of this preferred embodiment
f = 3.64 mm, Fno = 2.80, HFOV = 31.0 deg.

| Surface # | | Curvature Radius | Thickness | Material | Refractive Index | Abbe # | Focal length |
|---|---|---|---|---|---|---|---|
| 0 | Object | Plano | Infinity | | | | |
| 1 | Lens 1 | 1.601949 (ASP) | 0.556 | Plastic | 1.530 | 55.8 | 2.99 |
| 2 | | −146.146049 (ASP) | 0.062 | | | | |
| 3 | Ape. Stop | Plano | 0.008 | | | | |
| 4 | Lens 2 | 4.628866 (ASP) | 0.391 | Plastic | 1.634 | 23.8 | −4.38 |

TABLE 19-continued

Optical data of this preferred embodiment
f = 3.64 mm, Fno = 2.80, HFOV = 31.0 deg.

| Surface # | | Curvature Radius | Thickness | Material | Refractive Index | Abbe # | Focal length |
|---|---|---|---|---|---|---|---|
| 5 | | 1.679397 (ASP) | 0.416 | | | | |
| 6 | Lens 3 | −8.439197 (ASP) | 0.508 | Plastic | 1.535 | 56.3 | 4.79 |
| 7 | | −2.007234 (ASP) | 0.608 | | | | |
| 8 | Lens 4 | −0.808228 (ASP) | 0.289 | Plastic | 1.607 | 26.6 | −6.01 |
| 9 | | −1.178080 (ASP) | 0.070 | | | | |
| 10 | Lens 5 | 1.075468 (ASP) | 0.596 | Plastic | 1.535 | 56.3 | 9.87 |
| 11 | | 1.089824 (ASP) | 0.405 | | | | |
| 12 | IR-filter | Plano | 0.210 | Glass | 1.517 | 64.2 | — |
| 13 | | Plano | 0.511 | | | | |
| 14 | Image | Plano | — | | | | |

Note:
Reference wavelength is 587.6 nm. ASP stands for aspherical surfaces.

The optical data of this preferred embodiment are listed in Table 19, wherein the object-side surfaces and the image-side surfaces of the first lens element 710 to the fifth lens element 750 comply with the aspherical surface formula as given in Equation (18), and their aspheric coefficients are listed in Table 20 as follows:

TABLE 20

Aspheric coefficients of this preferred embodiment

| Surface # | 1 | 2 | 4 | 5 | 6 |
|---|---|---|---|---|---|
| k= | 9.61127E−01 | 2.00000E+01 | 8.17125E+00 | 9.55319E−01 | 2.00000E+01 |
| A4= | −1.23067E−02 | 2.82220E−03 | 1.13399E−01 | −1.21421E−01 | −8.98736E−02 |
| A6= | −5.22076E−03 | 9.39532E−02 | 1.19094E−01 | 7.88987E−02 | −1.88241E−01 |
| A8= | 2.71318E−03 | −1.64406E−01 | −1.73535E−01 | −6.01553E−02 | 3.88412E−01 |
| A10= | −5.55961E−03 | 1.84195E−01 | 1.34584E−01 | 1.04269E−01 | −7.89076E−01 |
| A12= | 4.07225E−03 | −9.72212E−02 | −9.56996E−02 | −6.11421E−02 | 6.29515E−01 |

| Surface # | 7 | 8 | 9 | 10 | 11 |
|---|---|---|---|---|---|
| k= | −8.31356E+00 | −5.93838E+00 | −3.97892E+00 | −7.52866E+00 | −4.10697E+00 |
| A4= | −1.65464E−01 | −6.54219E−02 | −4.85093E−02 | −1.62316E−01 | −1.14341E−01 |
| A6= | −6.77360E−02 | −2.43177E−02 | −3.87999E−02 | −1.42159E−02 | 3.43945E−02 |
| A8= | 1.21137E−01 | 8.96440E−02 | 8.67309E−02 | 3.41635E−02 | −6.84089E−03 |
| A10= | −1.72041E−01 | −1.64081E−02 | −3.88205E−02 | −1.41233E−02 | −8.78604E−05 |
| A12= | 7.93465E−02 | −1.15833E−02 | 1.29346E−02 | −6.80762E−04 | 1.19797E−04 |
| A14= | | 2.72550E−03 | −2.93373E−03 | 1.73516E−03 | 2.19126E−05 |
| A16= | | | | −2.64387E−04 | −6.10152E−06 |

With reference to Table 19 and FIG. 7B for an optical imaging lens assembly of this preferred embodiment, the optical imaging lens assembly has a focal length f=3.64 (mm), an f-number Fno=2.80, and a half of maximum view angle HFOV=31.0°. After the optical data of this preferred embodiment are calculated and derived, the optical imaging system for pickup satisfies related conditions as shown in Table 21 below, and the related symbols have been described above and thus will not be described again.

TABLE 21

Data of related relations of this preferred embodiment

| Relation | Data | Relation | Data |
|---|---|---|---|
| V1 − V2 | 32.0 | R10/CT5 | 1.83 |
| V3 − V4 | 29.7 | f/R9 | 3.39 |
| T23/T34 | 0.68 | f/f$_3$ | 0.76 |
| (R1 + R2)/(R1 − R2) | −0.98 | Sd/Td | 0.82 |
| R4/R3 | 0.36 | TTL/ImgH | 1.91 |
| R$_6$/CT$_3$ | −3.95 | | |

According to the optical data as shown in Table 19 and the series of aberration curves as shown in FIG. 7B, the optical imaging lens assembly in accordance with this preferred embodiment of the present disclosure provides good correction results in aspects of the longitudinal spherical aberration, astigmatic field curving, and distortion.

In the optical imaging lens assembly of the present disclosure, the lens elements can be made of glass or plastic. For the lens elements made of glass, the optical imaging system for pickup can have higher degree of freedom in selecting design parameters. For the lens elements made of plastic, the production cost can be lowered.

In the optical imaging lens assembly of the present disclosure, if the lens element has a convex surface, then the surface of the lens element is convex at a position in proximity to the axis; and if the lens element has a concave surface, then the surface of the lens element is concave at a position in proximity to the axis.

In the optical imaging lens assembly of the present disclosure, at least one stop such as a glare stop or a field stop can be provided for reducing stray lights to improve the image quality, to limit the field size, or other functionalities. Any of the stops can be positioned in front of the first lens element, between lens elements, or before the image plane of the optical imaging lens assembly according to the preference of the optical designer. Additionally, the optical imaging lens assembly can be utilized in 3D (three-dimensional) applications.

Tables 1 to 21 show changes of values of an optical imaging lens assembly in accordance with different preferred embodiments of the present disclosure respectively, and even if different values are used, products of the same structure are intended to be covered by the scope of the present disclosure. It is noteworthy to point out that the aforementioned description and the illustration of related drawings are provided for the purpose of explaining the technical characteristics of the present disclosure, but not intended for limiting the scope of the present disclosure.

What is claimed is:

1. An optical imaging lens assembly comprising five lens elements, the five lens elements being, from an object side to an image side: a first lens element, a second lens element, a third lens element, a fourth lens element and a fifth lens element, each of the five lens elements having an object-side surface facing toward the object side and an image-side surface facing toward the image side;
   wherein the object-side surface of the second lens element is convex, the image-side surface of the fourth lens element is convex, the image-side surface of the fifth lens element is concave, and the image-side surface of the fifth lens element has at least one inflection point;
   wherein the optical imaging lens assembly further comprises an aperture stop disposed between the first lens element and the second lens element, and a focal length of the first lens element and a focal length of the fourth lens element have different signs;
   wherein T23 is an axial distance between the second lens element and the third lens element, T34 is an axial distance between the third lens element and the fourth lens element, R10 is a curvature radius of the image-side surface of the fifth lens element, CT5 is a central thickness of the fifth lens element, and the following relations are satisfied:

$0.1<T23/T34<2.0$; and $1.3<R10/CT5<3.0$.

2. The optical imaging lens assembly of claim 1, wherein the third lens element has positive refractive power.

3. The optical imaging lens assembly of claim 1, wherein the fifth lens element has negative refractive power.

4. The optical imaging lens assembly of claim 1, wherein the object-side surface of the fourth lens element is concave.

5. The optical imaging lens assembly of claim 1, wherein f is a focal length of the optical imaging lens assembly, R9 is a curvature radius of the object-side surface of the fifth lens element, and the following relation is satisfied:

$-0.8<f/R9<6.0$.

6. The optical imaging lens assembly of claim 1, wherein R1 is a curvature radius of the object-side surface of the first lens element, R2 is a curvature radius of the image-side surface of the first lens element, and the following relation is satisfied:

$-1.5<(R1+R2)/(R1-R2)<-0.3$.

7. The optical imaging lens assembly of claim 1, wherein a central thickness of the fourth lens element is smaller than a central thickness of the first lens element.

8. The optical imaging lens assembly of claim 1, wherein the axial distance between the third lens element and the fourth lens element is smaller than a central thickness of the first lens element.

9. The optical imaging lens assembly of claim 1, wherein an absolute value of the focal length of the first lens element is smaller than an absolute value of a focal length of the fifth lens element.

10. The optical imaging lens assembly of claim 1, wherein an absolute value of a curvature radius of the object-side surface of the fourth lens element is smaller than an absolute value of a curvature radius of the image-side surface of the first lens element.

11. The optical imaging lens assembly of claim 1, wherein a curvature radius of the image-side surface of the second lens element and a curvature radius of the object-side surface of the third lens element have different signs.

12. An optical imaging lens assembly comprising five lens elements, the five lens elements being, from an object side to an image side: a first lens element, a second lens element, a third lens element, a fourth lens element and a fifth lens element, each of the five lens elements having an object-side surface facing toward the object side and an image-side surface facing toward the image side;
    wherein the second lens element has negative refractive power, the object-side surface of the second lens element is convex, the image-side surface of the second lens element is concave, the image-side surface of the fourth lens element is convex, and the image-side surface of the fifth lens element has at least one inflection point;
    wherein an absolute value of a focal length of the first lens element is smaller than an absolute value of a focal length of the second lens element, an absolute value of a curvature radius of the object-side surface of the second lens element is smaller than an absolute value of a curvature radius of the object-side surface of the third lens element, and the focal length of the first lens element and a focal length of the fourth lens element have different signs;
    wherein R6 is a curvature radius of the image-side surface of the third lens element, CT3 is a central thickness of the third lens element, and the following relation is satisfied:

$-4.5<R6/CT3<-0.5$.

13. The optical imaging lens assembly of claim 12, wherein the fifth lens element has negative refractive power.

14. The optical imaging lens assembly of claim 12, wherein the object-side surface of the third lens element is concave.

15. The optical imaging lens assembly of claim 12, wherein a curvature radius of the object-side surface of the fifth lens element and a curvature radius of the image-side surface of the fifth lens element have the same sign;
    wherein R3 is the curvature radius of the object-side surface of the second lens element, R4 is a curvature radius of the image-side surface of the second lens element, and the following relation is satisfied:

$0.1 < R4/R3 < 0.8.$

16. The optical imaging lens assembly of claim 12, wherein the fifth lens element is made of plastic, and there is an air gap between each of adjacent lens elements among the five lens elements.

17. The optical imaging lens assembly of claim 12, wherein an axial distance between the third lens element and the fourth lens element is smaller than the central thickness of the third lens element.

18. The optical imaging lens assembly of claim 12, wherein an absolute value of a curvature radius of the image-side surface of the fifth lens element is smaller than an absolute value of a curvature radius of the object-side surface of the first lens element.

19. The optical imaging lens assembly of claim 12, wherein a curvature radius of the image-side surface of the first lens element and a curvature radius of the object-side surface of the fourth lens element have the same sign.

20. The optical imaging lens assembly of claim 12, wherein a curvature radius of the image-side surface of the first lens element and a curvature radius of the object-side surface of the fifth lens element have different signs.

\* \* \* \* \*